United States Patent [19]

Sunagawa et al.

[11] Patent Number: 5,153,860

[45] Date of Patent: *Oct. 6, 1992

[54] OPTICAL PICKUP APPARATUS FOR DETECTING AND CORRECTING FOCUSING AND TRACKING ERRORS IN DETECTED RECORDED SIGNALS

[75] Inventors: Hiroshi Sunagawa, Kanagawa; Toshiaki Suhara; Hiroshi Nishihara, both of Ohsaka, all of Japan

[73] Assignee: Fuji Photo Film Co., Ltd., Kanagawa, Japan

[*] Notice: The portion of the term of this patent subsequent to May 23, 2006 has been disclaimed.

[21] Appl. No.: 704,691

[22] Filed: May 17, 1991

Related U.S. Application Data

[63] Continuation of Ser. No. 183,880, Apr. 20, 1988, abandoned.

[30] Foreign Application Priority Data

Apr. 20, 1987 [JP] Japan .................................. 62-96717
Apr. 20, 1987 [JP] Japan .................................. 62-96720

[51] Int. Cl.⁵ ........................ G11B 13/04; G11B 11/14
[52] U.S. Cl. ........................ 369/13; 360/59; 360/114; 369/112; 369/110
[58] Field of Search ............. 369/13, 110, 112, 44.12, 369/44.13, 44.14, 44.23, 44.26, 44.42; 360/59, 114; 250/201 DF

[56] References Cited

U.S. PATENT DOCUMENTS

| | | | |
|---|---|---|---|
| 4,672,187 | 6/1987 | Fujita et al. | 250/201 DF |
| 4,718,052 | 1/1988 | Kondo et al. | 369/112 |
| 4,733,065 | 3/1988 | Hoshi et al. | 369/112 |
| 4,737,946 | 4/1988 | Yamashita et al. | 369/112 |
| 4,779,259 | 10/1988 | Kono et al. | 369/112 |
| 4,797,867 | 1/1989 | Sunagawa et al. | 369/45 |
| 4,833,561 | 5/1989 | Sunagawa et al. | 369/13 |

Primary Examiner—Hoa Nguyen
Attorney, Agent, or Firm—Sughrue, Mion, Zinn, Macpeak & Seas

[57] ABSTRACT

A pickup apparatus for a magneto-optical recording medium comprises a waveguide for receiving a light beam reflected by a magneto-optical recording medium, and first and second focusing grating couplers disposed side by side on the waveguide for introducing the reflected light beam into the waveguide in a TE or TM guided mode and converging the thus guided optical waves at two positions spaced from each other. First and second photodetectors are mounted on the waveguide for detecting the optical waves converged by the first and second focusing grating couplers. Tracking error and focusing error are detected based on the outputs of the first and second photodetectors, and recorded signals are detected based on the output of the first photodetector and/or the output of the second photodetector. In another embodiment, three focusing grating couplers are disposed on two waveguides.

17 Claims, 11 Drawing Sheets

F I G. 4
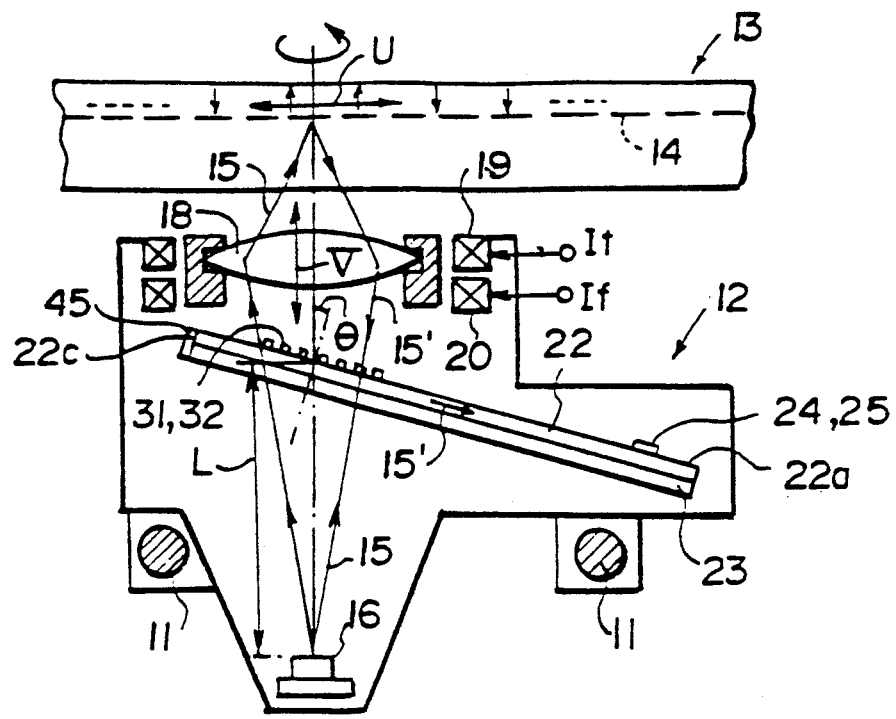
F I G. 5
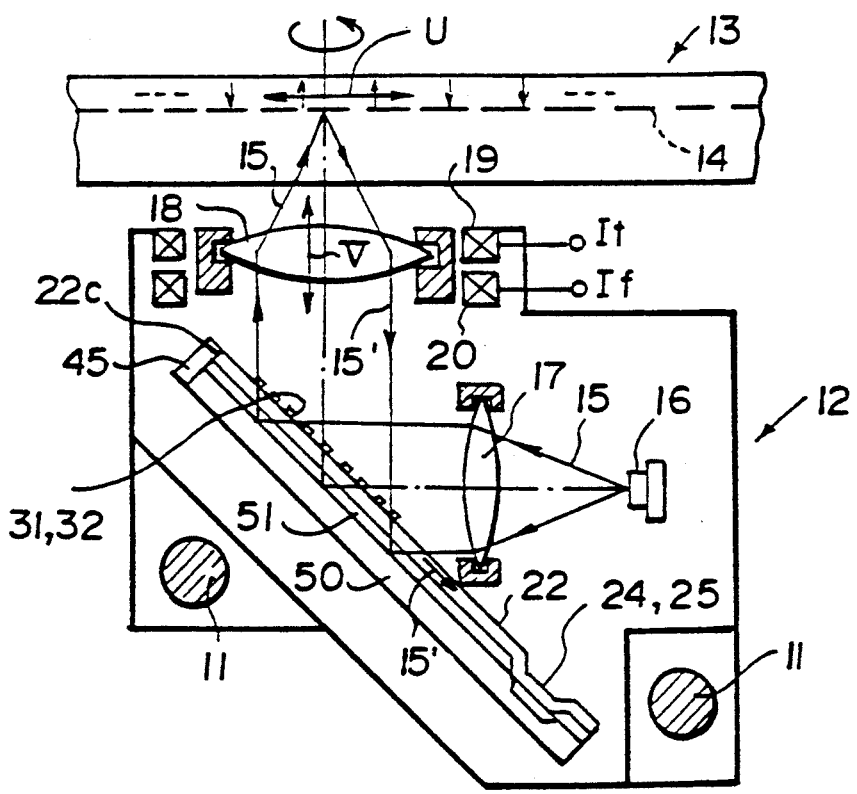

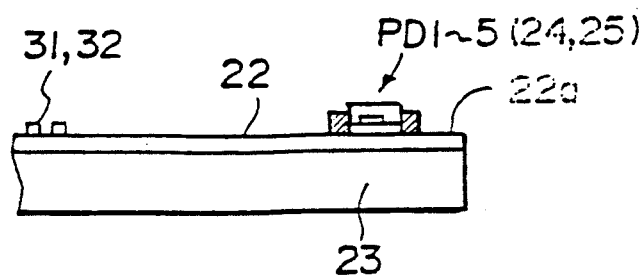
F I G. 10
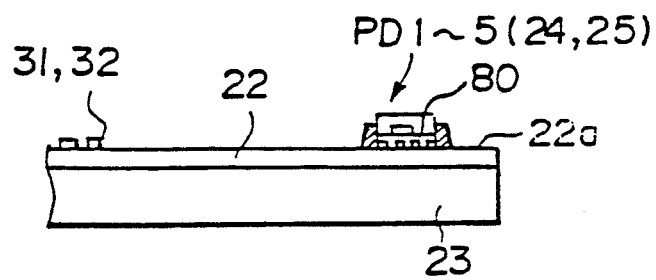
F I G. 11
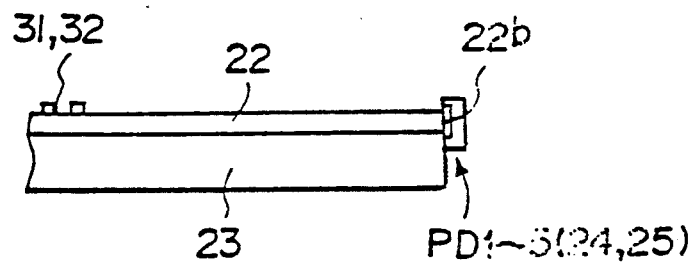
F I G. 12

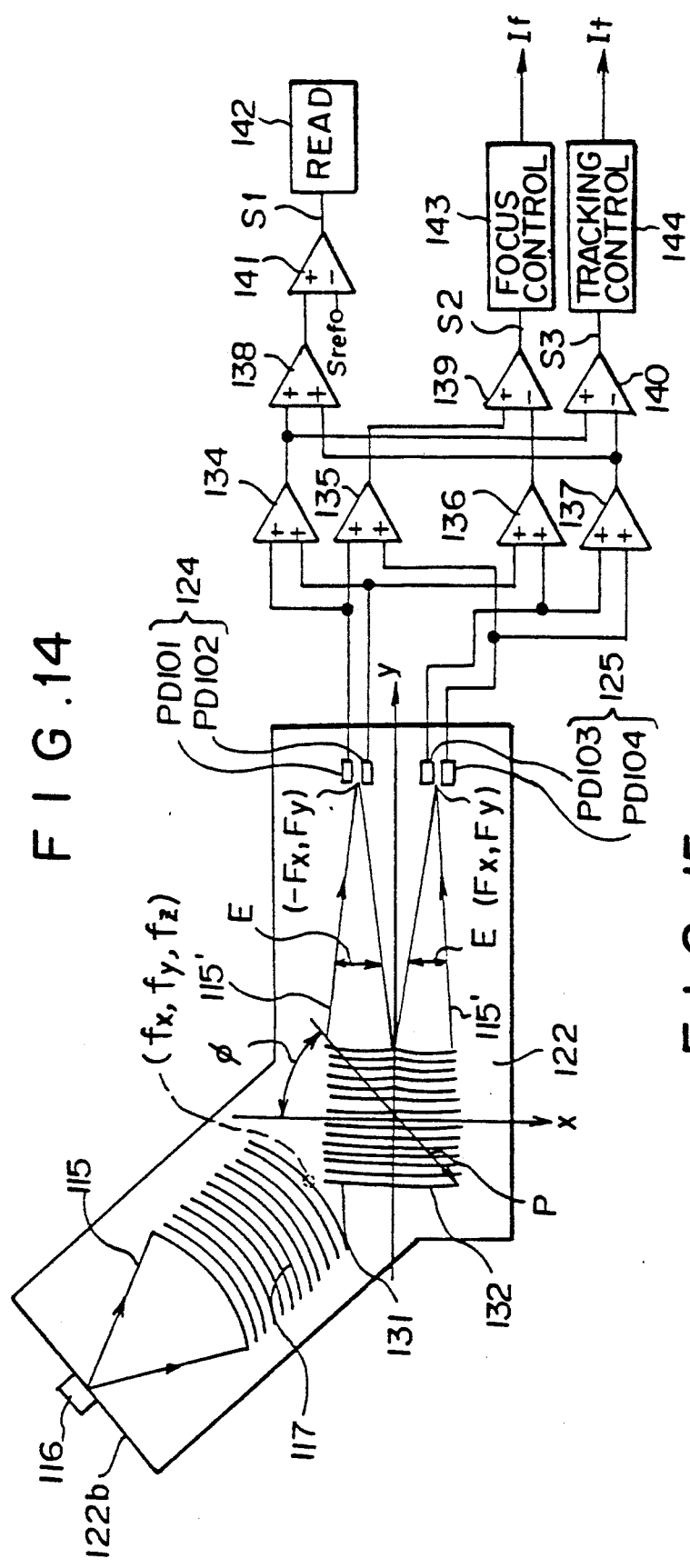

F I G. 21
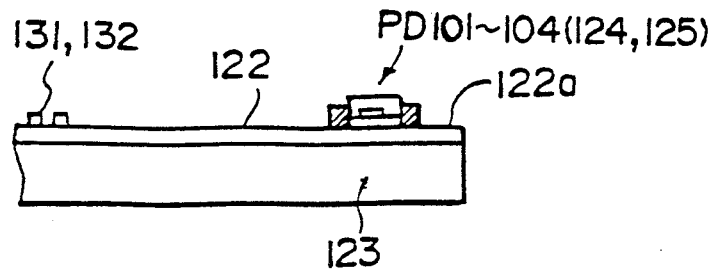
F I G. 22
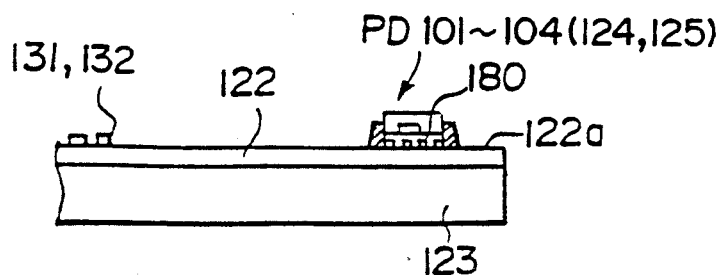
F I G. 23
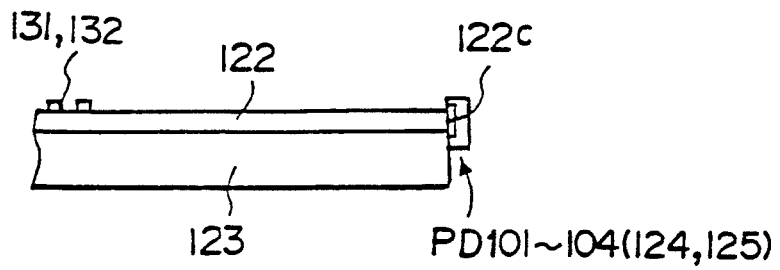
F I G. 24
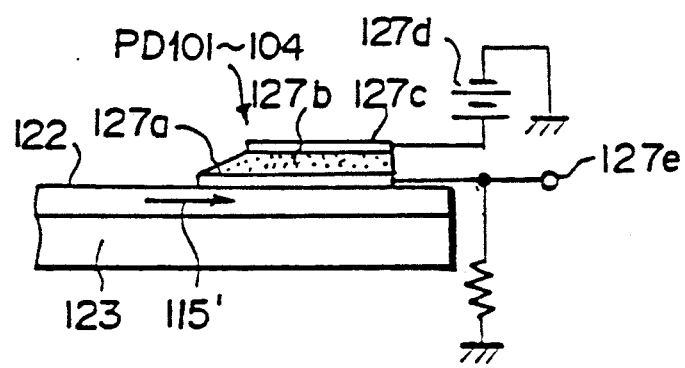

OPTICAL PICKUP APPARATUS FOR DETECTING AND CORRECTING FOCUSING AND TRACKING ERRORS IN DETECTED RECORDED SIGNALS

This is a continuation of application Ser. No. 183,880, filed Apr. 20, 1988, now abandoned.

BACKGROUND OF THE INVENTION

1. Field of the Invention

This invention relates to a pickup apparatus for detecting (reading out) signals recorded on a magneto-optical recording medium such as a magneto-optical disk. This invention particularly relates to a pickup apparatus using an optical waveguide.

2. Description of the Prior Art

In recent years, magneto-optical recording media such as magneto-optical disks are widely used as recording media for image signals, audio signals or the like. Signals recorded on the magneto-optical recording medium in terms of directions of magnetization are detected by use of an optical pickup apparatus. The optical pickup apparatus is constituted to irradiate, for example, linearly polarized light such as a laser beam to the surface of the magneto-optical recording medium, and to detect the directions of magnetization on the magneto-optical recording medium by utilization of the magnetic Kerr effects with which the plane of polarization of the light reflected by the magneto-optical recording medium is rotated in accordance with the direction of magnetization.

Specifically, with the pickup apparatus for the magneto-optical recording medium, the light reflected by the magneto-optical recording medium is detected by a photodetector via an analyzer, and the directions of magnetization, i.e. the recorded signals, are detected by utilizing such effects that the detected optical amounts change in accordance with the rotation of the plane of polarization of the reflected light. Besides the function of carrying out detection of the recorded signals as mentioned above, the pickup apparatus is required to have the function of detecting tracking error, i.e. the function of detecting whether the light beam for the detection of the condition of magnetization is deviated rightward or leftward from the center of a track along a predetermined groove, and the function of detecting focusing error, i.e. the function of detecting whether the focusing point of the light beam is deviated forward or backward from the reflection surface of the magneto-optical recording medium. A signal representing the tracking error or the focusing error is utilized to control tracking or focusing so that the signal is canceled, thereby to irradiate the light beam accurately to the predetermined track or to focus the light beam accurately onto the reflection surface of the magneto-optical recording medium. As the method of detecting a tracking error, there have heretofore been known the push-pull technique, the heterodyning technique, temporal (time difference) detection technique and other such techniques. On the other hand, as the method of detecting a focusing error, there have heretofore been known the astigmatism technique, the critical angle detection technique, the Foucault technique and other such techniques.

In order to provide the aforesaid functions together with the signal detecting function, the conventional pickup apparatus for a magneto-optical recording medium is composed of small optical elements such as a beam splitter for splitting a light beam reflected by a magneto-optical recording medium from the light beam irradiated onto the magneto-optical recording medium, a lens for converging the reflected light beam in the vicinity of a photodetector such as a photodiode, the aforesaid analyzer, and a prism for carrying out the tracking error detecting method and the focusing error detecting method.

However, the aforesaid small optical elements require accurate machining or processing, and troublesome adjustment of positions of the small optical elements with respect to each other must be carried out at the time of assembling the pickup apparatus. Therefore, the pickup apparatus using such optical elements naturally becomes expensive. Also, the pickup apparatus having the configuration as mentioned above is large and heavy, and therefore is disadvantageous from the viewpoint of making the read-out apparatus small and light and shortening the access time.

Accordingly, various attempts have heretofore been made to eliminate the aforesaid drawbacks of the conventional pickup apparatus by simplifying the configuration of the pickup apparatus by use of, for example, a special optical element such as an aspherical lens. However, the optical element of this type is very expensive, and therefore the cost of the pickup apparatus using such an optical element does not become much lower than the cost of the aforesaid pickup apparatus even though the configuration is simplified.

SUMMARY OF THE INVENTION

The primary object of the present invention is to provide a pickup apparatus for a magneto-optical recording medium, which is small and light.

Another object of the present invention is to provide a pickup apparatus for a magneto-optical recording medium, which is fabricated with a very low cost.

A first pickup apparatus for a magneto-optical recording medium in accordance with the present invention is constituted so that the effects of the optical elements such as a beam splitter, a lens, a prism, and an analyzer in the conventional pickup apparatus are achieved by a single optical waveguide element provided with focusing grating couplers.

Specifically, the present invention provides a first pickup apparatus for a magneto-optical recording medium, which comprises:

i) a light source for irradiating a linearly polarized light beam onto a surface of a magneto-optical recording medium, ii) an objective lens for converging said light beam onto the reflection surface of said magneto-optical recording medium, iii) an optical waveguide disposed in such a direction that one surface of said optical waveguide receives the light beam reflected by said magneto-optical recording medium, iv) a first focusing grating coupler and a second focusing grating coupler provided side by side at an incidence position of said reflected light beam on the surface of said optical waveguide so that an axis passing through approximately the center of said reflected light beam and extending on said surface of said optical waveguide approximately normal to a tracking direction intervenes between said first focusing grating coupler and said second focusing grating coupler, so that said first focusing grating coupler and said second focusing grating coupler respectively make said reflected light beam enter said optical waveguide by exciting a TE guided mode or a TM guided mode, and respectively converge the optical waves, which are thus guided through said optical waveguide, to positions spaced from each other with said axis intervening therebetween, v) a first photodetector and a second photodetector mounted on the surface or an edge face of said optical waveguide for respectively detecting the optical wave converged by said first focusing grating coupler and the optical wave converged by said second focusing grating coupler, vi) an error detection circuit for carrying out detection of tracking error and detection of focusing error on the basis of outputs of said first photodetector and said second photodetector, and vii) a magneto-optical signal detection circuit for detecting signals recorded on said magneto-optical recording medium on the basis of the output of said first photodetector and/or the output of said second photodetector.

Each of the first and second focusing grating couplers is a diffraction grating having a curvature or a curvature and "chirp". The focusing grating coupler directly couples the wave surface outside of the optical waveguide with the wave surface of the optical wave guided inside of the optical waveguide, and converges the guided optical wave in the optical waveguide.

A second pickup apparatus for a magneto-optical recording medium in accordance with the present invention is constituted so that the effects of the optical elements such as an objective lens for converging a light beam emitted by a light source onto a reflection surface of a magneto-optical recording medium, a beam splitter, a converging lens, a prism, and an analyzer in the conventional pickup apparatus are achieved by optical waveguide elements provided with focusing grating couplers.

Specifically, the present invention also provides a second pickup apparatus for a magneto-optical recording medium, which comprises:

i) a first optical waveguide, ii) a light source mounted on said first optical waveguide for emitting a linearly polarized light beam into said first optical waveguide, iii) a first focusing grating coupler formed on a surface of said first optical waveguide for radiating the optical wave, which is thus guided through said first optical waveguide, out of said first optical waveguide, and converging said radiated optical wave on a reflection surface of a magneto-optical recording medium, iv) a second optical waveguide combined integrally with said first optical waveguide and disposed in such a direction that one surface of said second optical waveguide receives the optical wave reflected by said magneto-optical recording medium, v) a second focusing grating coupler and a third focusing grating coupler provided side by side at an incidence position of said reflected optical wave on the surface of said second optical waveguide so that an axis passing through approximately the center of said reflected optical wave and extending on said surface of said second optical waveguide approximately normal to a tracking direction intervenes between said second focusing grating coupler and said third focusing grating coupler, so that said second focusing grating coupler and said third focusing grating coupler respectively make said reflected optical wave enter said second optical waveguide by exciting a TE guided mode or a TM guided mode, and respectively converge the optical waves, which are thus guided through said second optical waveguide, to positions spaced from each other with said axis intervening therebetween, vi) a first photodetector and a second photodetector mounted on the surface or an edge face of said second optical waveguide for respectively detecting the optical wave converged by said second focusing grating coupler and the optical wave converged by said third focusing grating coupler, vii) an error detection circuit for carrying out detection of tracking error and detection of focusing error on the basis of outputs of said first photodetector and said second photodetector, and viii) a magneto-optical signal detection circuit for detecting signals recorded on said magneto-optical recording medium on the basis of the output of said first photodetector and/or the output of said second photodetector.

In the second pickup apparatus for a magneto-optical recording medium in accordance with the present invention, each of the first, second and third focusing grating couplers is a diffraction grating having a curvature or a curvature and "chirp". The focusing grating coupler directly couples the wave surface outside of the optical waveguide with the wave surface of the optical wave guided inside of the optical waveguide, and converges the reflected optical wave, which is radiated out of the optical waveguide, at a position outward from the optical waveguide, or converges the guided optical wave in the optical waveguide.

With the first pickup apparatus for a magneto-optical recording medium in accordance with the present invention, the effects of the optical elements such as a beam splitter, a lens, a prism, and an analyzer in the conventional pickup apparatus are achieved by the focusing grating couplers formed on the optical waveguide. Therefore, the first pickup apparatus for a magneto-optical recording medium in accordance with the present invention can be fabricated small and light with a very small number of parts. Accordingly, the cost of the apparatus becomes markedly lower and the access time can be shortened as compared with the conventional pickup apparatus.

Also, the major part of the first pickup apparatus for a magneto-optical recording medium in accordance with the present invention can be readily mass-produced by a planar technique. This feature also contributes to reduction in the cost of the apparatus.

The first pickup apparatus for a magneto-optical recording medium in accordance with the present invention is free from adjustment of positions of the optical elements as in the conventional pickup apparatus. Also, with the first pickup apparatus for a magneto-optical recording medium in accordance with the present invention wherein the photodetectors are coupled with the optical waveguide, it is not necessary to carry out adjustment of the positions of the photodetectors with respect to the optical elements. These features also contribute to reduction in the cost of the apparatus.

With the second pickup apparatus for a magneto-optical recording medium in accordance with the present invention, the effects of the optical elements such as an objective lens, a beam splitter, a converging lens, a prism, and an analyzer in the conventional pickup apparatus are achieved by the focusing grating couplers formed on the optical waveguides. Therefore, the second pickup apparatus for a magneto-optical recording medium in accordance with the present invention can be fabricated small and light with a very small number of parts. Accordingly, the cost of the apparatus becomes markedly lower and the access time can be shortened as compared with the conventional pickup apparatus.

Also, the major part of the second pickup apparatus for a magneto-optical recording medium in accordance with the present invention can be readily mass-produced by a planar technique. This feature also contributes to reduction in the cost of the apparatus.

The second pickup apparatus for a magneto-optical recording medium in accordance with the present invention is free from adjustment of positions of the optical elements as in the conventional pickup apparatus. Also, with the second pickup apparatus for a magneto-optical recording medium in accordance with the present invention wherein the photodetectors are coupled with the optical waveguide, it is not necessary to carry out adjustment of the positions of the photodetectors with respect to the optical elements. These features also contribute to reduction in the cost of the apparatus.

Also, with the second pickup apparatus for a magneto-optical recording medium in accordance with the present invention wherein the first optical waveguide and the second optical waveguide combined integrally are moved in the course of carrying out the tracking control and the focusing control, the relationship between the position of the first focusing grating coupler for radiation of the optical wave on one hand and the positions of the second focusing grating coupler and the third focusing grating coupler for receiving the reflected optical wave on the other hand does not change even though the tracking control and the focusing control are carried out. Therefore, the second pickup apparatus in accordance with the present invention is free from the problem that the optical amount of the reflected light beam detected fluctuates in accordance with the inclination of the objective lens, thereby to cause noise in the read-out signals detected from the recorded information, or a tracking error is caused by offset of the objective lens, as in the case of the conventional apparatus wherein the objective lens is moved for the purposes of the tracking control and the focusing control. Also, the elements on the light beam source side and the elements on the reflected optical wave receiving side are constituted by the optical waveguide elements which are light. Therefore, even though the elements on the light beam source side and the elements on the reflected optical wave receiving side are moved together, the control response characteristics can be maintained high.

With the first pickup apparatus for a magneto-optical recording medium in accordance with the present invention, the light beam reflected by the magneto-optical recording medium is introduced by the focusing grating couplers into the optical waveguide, and is thus separated from the optical path of the light beam advancing from the light source toward the magneto-optical recording medium. This effect is the same as the effect of the beam splitter in the conventional pickup apparatus. Also, the focusing grating couplers converge the guided optical waves (reflected light beam) in the optical waveguide. The converging effect of the focusing grating couplers is the same as the effect of the lens in the conventional pickup apparatus. Further, since the first focusing grating coupler and the second focusing grating coupler are disposed at the positions as mentioned above, the light beam reflected by the magneto-optical recording medium and incident upon the focusing grating couplers is separated into two guided optical waves in the tracking direction and converged onto two spots. This effect is the same as the effect of the prism in the conventional pickup apparatus.

Also, the optical amounts of the reflected light beam introduced by the first focusing grating coupler and the second focusing grating coupler into the optical waveguide change in accordance with the direction of polarization of the reflected light beam. Therefore, the direction of polarization of the reflected light beam, i.e. the signal recorded on the magneto-optical recording medium, can be detected by measuring the output of the first photodetector and/or the output of the second photodetector. Thus the same effects as those of the aforesaid analyzer can be obtained by use of the first focusing grating coupler and the second focusing grating coupler.

Particularly, in the case where the first focusing grating coupler and the second focusing grating coupler are constituted to excite a common guided mode, the sum of the outputs of the first photodetector and the second photodetector becomes constant regardless of a tracking error and a focusing error. Therefore, the signals recorded on the magneto-optical recording medium can be detected accurately on the basis of the sum of the outputs.

With the second pickup apparatus for a magneto-optical recording medium in accordance with the present invention, the optical wave impinging upon the magneto-optical recording medium is converted on the reflection surface of the magneto-optical recording medium by the first focusing grating coupler provided on the first optical waveguide. In this manner, the effect of the aforesaid objective lens is achieved. On the other hand, the optical wave reflected by the magneto-optical recording medium is introduced by the second focusing grating coupler and the third focusing grating coupler into the second optical waveguide, whereby the optical path of the reflected optical wave is bent and the reflected optical wave is guided to the photodetectors. This effect is the same as the effect of the beam splitter in the conventional pickup apparatus. Also, the second focusing grating coupler and the third focusing grating coupler converge the guided optical waves in the second optical waveguide. The converging effect of the focusing grating couplers is the same as the effect of the converging lens in the conventional pickup apparatus. Further, since the second focusing grating coupler and the third focusing grating coupler are disposed at the positions as mentioned above, the optical wave reflected by the magneto-optical recording medium and incident upon the focusing grating couplers is separated into two guided optical waves in the tracking direction and converged onto two spots. This effect is the same as the effect of the prism in the conventional pickup apparatus.

Also, the optical amounts of the reflected light beam introduced by the second focusing grating coupler and the third focusing grating coupler into the second optical waveguide change in accordance with the direction of polarization of the reflected light beam. Therefore, the direction of polarization of the reflected light beam, i.e. the signal recorded on the magneto-optical recording medium, can be detected by measuring the output of the first photodetector and/or the output of the second photodetector. Thus the same effects as those of the aforesaid analyzer can be obtained by use of the second focusing grating coupler and the third focusing grating coupler.

Particularly, in the case where the second focusing grating coupler and the third focusing grating coupler are constituted to excite a common guided mode, the sum of the outputs of the first photodetector and the second photodetector becomes constant regardless of a tracking error and a focusing error. Therefore, the signals recorded on the magneto-optical recording medium can be detected accurately on the basis of the sum of the outputs.

Also, with the configuration of the second pickup apparatus for a magneto-optical recording medium in accordance with the present invention wherein the first optical waveguide and the second optical waveguide are combined integrally, the relationship of the positions of the second focusing grating coupler and the third focusing grating coupler with respect to the position of the first focusing grating coupler is maintained constant even though the tracking control is carried out. Therefore, it is possible to prevent the problem that the optical amount of the reflected light beam detected fluctuates in accordance with the inclination of the objective lens, thereby to cause noise in the read-out signals detected from the recorded information, or a tracking error is caused by offset of the objective lens, as in the case of the conventional apparatus wherein the objective lens is moved for the purpose of the tracking control.

BRIEF DESCRIPTION OF THE DRAWINGS

FIGS. 10, 11 and 12 are side views showing further examples of the photodetectors used in the first pickup apparatus for a magneto-optical recording medium in accordance with the present invention, FIG. 14 is a schematic view showing the top plan shape of the optical waveguides in the embodiment shown in FIG. 13 and the electric circuit used for the embodiment, FIG. 15 is a side view showing the photodetector in the embodiment shown in FIG. 13, FIGS. 21, 22, 23 and 24 are side views showing further examples of the photodetectors used in the second pickup apparatus for a magneto-optical recording medium in accordance with the present invention.

DESCRIPTION OF THE PREFERRED EMBODIMENTS

The present invention will hereinbelow be described in further detail with reference to the accompanying drawings.

Figure 1:
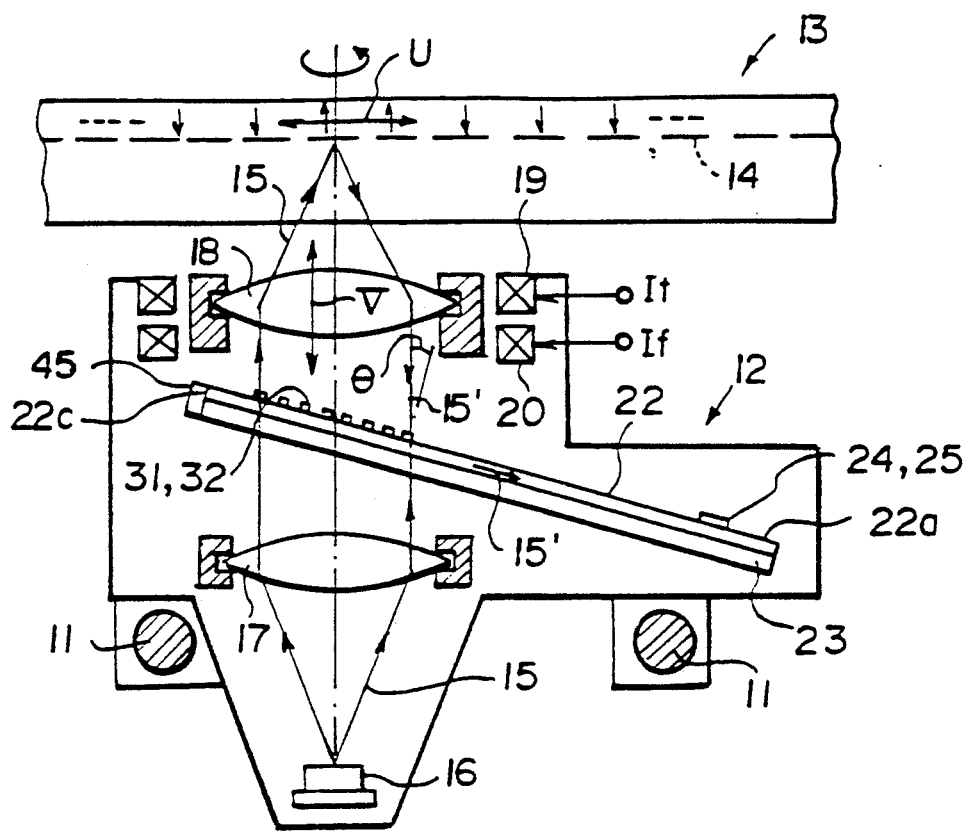
FIG. 1 is a side view showing an embodiment of the first pickup apparatus for a magneto-optical recording medium in accordance with the present invention.
Figure 2:
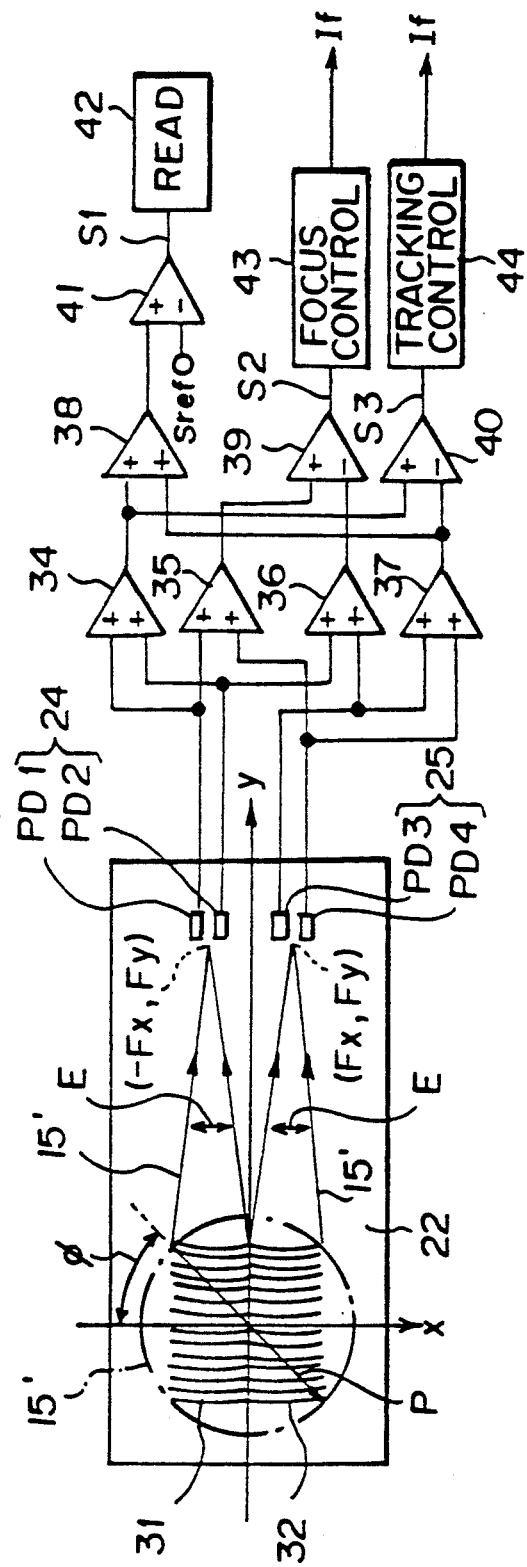
FIG. 2 is a schematic view showing the top plan shape of the optical waveguide in the embodiment shown in FIG. 1 and the electric circuit used for the embodiment.

FIG. 1 shows an embodiment of the first pickup apparatus for a magneto-optical recording medium in accordance with the present invention, and FIG. 2 shows the top plan view of the optical waveguides in the embodiment shown in FIG. 1 and an electric circuit used for the embodiment shown in FIG. 1. With reference to FIG. 1, the first pickup apparatus is provided with rods 11, 11 extending at an angle approximately normal to the drawing sheet in FIG. 1, and a block 12 moveable along the rods 11, 11. In order to follow along a signal string (track) along a predetermined groove, the block 12 is moved normal to or approximately normal to the direction of the track (i.e. the direction as indicated by the arrow U at the light beam incidence position) by, for example, a precision feed screw and an optical system feed motor.

The block 12 is provided with a semiconductor laser 16 for irradiating a linearly polarized light beam (a laser beam) 15 to a reflection surface 14 of a magneto-optical disk 13, a collimator lens 17 for collimating the divergent light beam 15 emitted by the semiconductor laser 16, and an objective lens 18 for converging the collimated light beam 15 onto the reflection surface 14 of the optical disk 13. For the purposes of tracking control and focusing control as will be described later, the objective lens 18 is supported moveably in a tracking direction parallel to the direction as indicated by the arrow U and in a focusing direction as indicated by the arrow V, and is moved in these directions by a tracking coil 19 and a focusing coil 20.

An optical waveguide 22 is disposed between the collimator lens 17 and the objective lens 18 in such a direction that a surface 22a of the optical waveguide 22 receives a light beam 15' reflected by the magneto-optical disk 13. The optical waveguide 22 is provided on a transparent support 23. Also, a first focusing grating coupler 31 and a second focusing grating coupler 32 are disposed adjacent to one another on the surface 22a of the optical waveguide 22 at the position upon which the reflected light beam 15' impinges (The focusing grating coupler will hereinafter be abbreviated to FGC.) Each of the first FGC 31 and the second FGC 32 is a diffraction grating having a curvature or a curvature and "chirp". The first FGC 31 and the second FGC 32 respectively introduce the reflected light beam 15' into the optical waveguide 22 and converge the reflected light beam 15' (optical waves 15', 15') thus guided through the optical waveguide 22 into a single spot in the optical waveguide 22. As shown in FIG. 2, the first FGC 31 and the second FGC 32 are disposed side by side so that a y axis on the optical waveguide 22 normal to the aforesaid tracking direction and passing through nearly the center of the reflected light beam 15' intervenes between the FGC 31 and the FGC 32. Also, the FGC 31 and the FGC 32 are formed to converge the optical waves 15', 15' to positions spaced from each other with the y axis intervening therebetween. Also, grating pitches of the first FGC 31 and the second FGC 32 are adjusted so that the first FGC 31 and the second FGC 32 receive the S wave linearly polarized in the x axis direction as shown in FIG. 2, and excite the TE guided mode. The first FGC 31 and the second FGC 32 may also be provided on the surface of the optical waveguide 22 opposite to the surface 22a, i.e. on the lower surface thereof in FIG. 1.

When positions on the optical waveguide 22 are defined by the y axis and the x axis, i.e. the axis in the tracking direction, and coordinates of the optical wave converging positions by the FGC 31 and the FGC 32 are respectively expressed as (−Fx, Fy) and (Fx, Fy), an m'th grating pattern of each of the FGC 31 and the FGC 32 having the aforesaid effects is expressed as $$y \sin\theta + N_{TE} \sqrt{(x \mp Fx)^2 + (y - Fy)^2} = m\lambda + \text{const.}$$

(double signs: "+" for the FGC 31, "−" for the FGC 32)

where $\lambda$ denotes the optical wavelength of the reflected light beam 15', $\theta$ denotes the angle of incidence of the reflected light beam 15' upon the FGC 31 and the FGC 32, and $N_{TE}$ denotes the effective refractive index of the optical waveguide 22 with respect to the TE mode optical wave.

As shown in FIG. 2, the optical waveguide 22 is disposed so that the x axis is inclined at an angle of 45° with respect to the direction of linear polarization of the reflected light beam 15' as indicated by the arrow P. The direction of linear polarization of the reflected light beam 15' rotates in accordance with the direction of magnetization in the magneto-optical disk 13. Therefore, in this embodiment, the direction of linear polarization of the light beam 15' reflected by an un-magnetized part is taken as a reference, and it is adjusted so that the x axis makes an angle of 45° with respect to said reference direction of linear polarization.

The optical waveguide 22 may be formed by, for example, sputtering #7059 glass onto the support 23 made of pyrex glass. On the other hand, the FGC 31 and the FGC 32 may be formed by, for example, forming a Si-N film on the optical waveguide 22 by PCVD (plasma-enhanced chemical vapor deposition), forming a resist pattern by the electron beam direct drawing method, and then transferring the pattern to the Si-N film by RIE. By way of example, in the case where the optical waveguide 22 (thickness: 0.76 μm), the FGC 31 and the FGC 32 are formed of the aforesaid materials, the center period of each of the FGC 31 and the FGC 32 which excite the TE guided mode and which have the grating patterns as defined by the aforesaid pattern formula is 0.782 μm.

Figure 3:
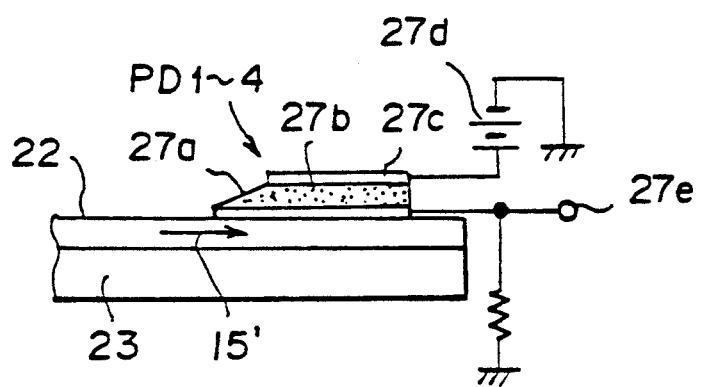
FIG. 3 is a side view showing the photodetector in the embodiment shown in FIG. 1, FIGS. 4 and 5 are side views showing further embodiments of the first pickup apparatus for a magneto-optical recording medium in accordance with the present invention.

On the other hand, a first photodetector 24 and a second photodetector 25 are disposed on the surface 22a of the optical waveguide 22 for respectively detecting the optical waves 15', 15' converged in the manner as mentioned above. By way of example, the first photodetector 24 is composed of photodiodes PD1 and PD2 divided from each other by a gap extending in parallel with the y axis, and the second photodetector 25 is composed of photodiodes PD3 and PD4 divided from each other by a gap extending in parallel with the y axis. As shown in detail in FIG. 3, each of the photodiodes PD1 to PD4 is formed by, for example, stacking a lower transparent electrode 27a, a thin film-like photoconductive material 27b, and an upper electrode 27c in this order on the optical waveguide 22. Also, an electric power source 27d is connected to apply a predetermined electric field between the lower transparent electrode 27a and the upper electrode 27c. With the photodiodes PD1 to PD4 having the configuration as mentioned above, when the photoconductive material 27b is exposed to light, a photocurrent of a level proportional to the amount of light flows through the photoconductive material 27b. Therefore, the optical amount which the photoconductive material 27b receives can be detected by detecting the change in potential at a terminal 27e. The thin film-like photoconductive material 27b may be constituted by, for example, an epitaxial film, a polycrystalline film or an amorphous film formed of Si or Ge as an element of Group IV of the periodic table, Se as an element of Group VI, GaAs of Groups III and V, ZnO or CdS of groups II and VI, or PbS of Groups IV and VI. The thin film-like photoconductive material 27b may also be constituted by a film forming a photodiode by generating the p-n junction or the p-i-n junction by the addition of atoms (B, P or the like) of the Group III or Group V to an amorphous calcogen film (a-Se, a-Se-As-Te or the like) or a film containing amorphous Si as the main constituent and also containing hydrogen and/or fluorine (a-Si:H, a-SiGe:H, a-SiC:H or the like), or by a film forming a photodiode by use of the film containing amorphous Si as the main constituent and also containing hydrogen and/or fluorine and an electrode constituting the Schottky junction.

As shown in FIG. 2, the outputs of the photodiodes PD1 and PD2 are added together by an addition amplifier 34, and the outputs of the photodiodes PD3 and PD4 are added together by an addition amplifier 37. Also, the output of the outer photodiode PD1 of the first photodetector 24 and the output of the outer photodiode PD4 of the second photodetector 25 are added together by an addition amplifier 35, and the outputs of the inner photodiodes PD2 and PD3 are added together by an addition amplifier 36. The outputs of the addition amplifiers 34 and 37 are fed to an addition amplifier 38 and a differential amplifier 40, and the outputs of the addition amplifiers 35 and 36 are fed to a differential amplifier 39. The output of the addition amplifier 38 is fed to a differential amplifier 41. The differential amplifier 41 also receives a reference signal Sref, and generates an output S1 in accordance with the difference between the two received inputs. The output S1 of the differential amplifier 41, an output S2 of the differential amplifier 39, and an output S3 of the differential amplifier 40 are respectively fed to a read-out circuit 42, a focusing coil drive control circuit 43 and a tracking coil drive control circuit 44.

Operations of the first pickup apparatus having the configuration as mentioned above will be described hereinbelow. The light beam (laser beam) 15 emitted by the semiconductor laser 16 and collimated by the collimator lens 17 passes through the support 23 and the optical waveguide 22, and is converged by the objective lens 18 so that the light beam 15 is focused on the reflection surface 14 of the magneto-optical disk 13. The magneto-optical disk 13 is rotated by a rotation drive means (not shown) so that the track is moved in the direction as indicated by the arrow U at the incidence position of the light beam 15. As is well known, the track is a string of image signals, audio signals or the like recorded by use of the directions of magnetization as indicated by the arrows above the reflection surface 14 in FIG. 1. As the direction of magnetization is reversed, the direction of linear polarization of the light beam 15' reflected by the magneto-optical disk 13 rotates reversely with respect to the direction of linear polarization of the light beam 15' reflected by the un-magnetized part. Specifically, the direction of linear polarization of the light beam 15' reflected by the part of the magneto-optical disk 13 magnetized in a direction rotates clockwise from the direction of polarization as indicated by the arrow P in FIG. 2, and the direction of linear polarization of the light beam 15' reflected by the part of the magneto-optical disk 13 magnetized in the reverse direction rotates counter-clockwise from the direction of polarization as indicated by the arrow P.

Figure 9:
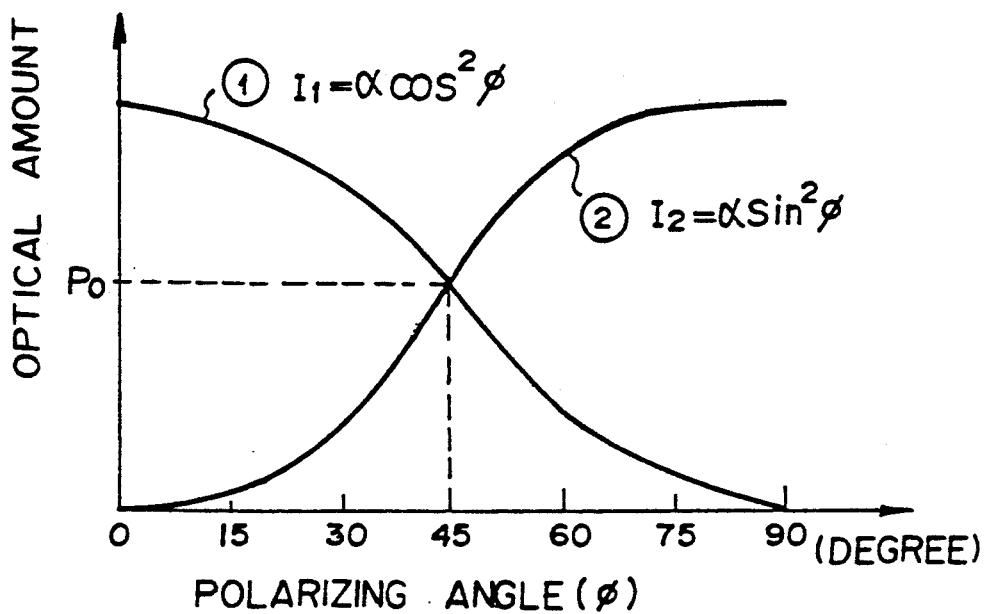
FIG. 9 is a graph showing the relationship between the angle of the plane of linear polarization of the reflected light beam and the optical amount introduced by the focusing grating coupler into the optical waveguide.

The reflected light beam 15' passes through the objective lens 18, and is introduced into the optical waveguide 22 by the FGC 31 and the FGC 32. The optical waves 15', 15' (the reflected light beam 15') guided through the optical waveguide 22 are converged into two spots with the y axis intervening therebetween by the beam converging effects of the FGC 31 and the FGC 32. The first FGC 31 and the second FGC 32 are formed to couple with the S-polarized light component (i.e. the polarized light component having an electric field at an angle normal to the drawing sheet in FIG. 1) of the reflected light beam 15' and to excite the TE guided mode as mentioned above, and guide the optical waves having the electric field vectors in the directions as indicated by the arrows E, E in FIG. 2 through the optical waveguide 22. Therefore, when the direction of linear polarization of the reflected light beam 15' rotates clockwise from the direction of polarization as indicated by the arrow P, the optical amounts of the reflected light beam 15' introduced by the first FGC 31 and the second FGC 32 into the optical waveguide 22 decrease. When the direction of linear polarization of the reflected light beam 15' rotates counter-clockwise from the direction of polarization as indicated by the arrow P, the optical amounts of the reflected light beam 15' introduced by the first FGC 31 and the second FGC 32 into the optical waveguide 22 increase. More specifically, in the case where the angle of the direction of linear polarization of the reflected light beam 15' with respect to the x axis as shown in FIG. 2 is $\phi$, the optical amount I1 introduced by the FGC 31 and the FGC 32 into the optical waveguide 22 changes in proportion to $\cos^2 \phi$ as indicated by a curve (1) in FIG. 9. Therefore, in the case where the reference signal Sref fed to the differential amplifier 41 is adjusted to the value corresponding to the optical amount Po at the time of the angle $\phi$ of 45° as shown in FIG. 9, the output of the differential amplifier 41 can be made "−" (minus) at the time the direction of linear polarization of the reflected light beam 15' is rotated clockwise from the direction as indicated by the arrow P in FIG. 2, and the output of the differential amplifier 41 can be made "+" (plus) at the time the direction of linear polarization of the reflected light beam 15' is rotated counter-clockwise from the direction as indicated by the arrow P. Accordingly, by discriminating the output S1 of the differential amplifier 41, the directions of magnetization of the magneto-optical disk 13, i.e. the recorded signals, can be detected.

As is clear from FIG. 9, in the case where the change width of the angle $\phi$ is constant, the change amount of the optical amount I1 is the largest and the differential output S1 is the largest when the middle of the change is at $\phi = 45°$. Therefore, even though the rotation angle (Kerr rotation angle) of the plane of linear polarization of the reflected light beam 15' caused by the difference in the direction of magnetization of the magneto-optical disk 13 is markedly small (in general, within the range of 0.3° to 0.5°), the rotation of the plane of polarization can be detected accurately. However, the sum of the optical amounts detected by the photodetectors 24 and 25, i.e. the sum of the outputs thereof, becomes the largest at the time the polarizing angle $\phi$ is equal to 0°. Therefore, from the viewpoint of the S/N ratio of the differential output S1, the center of the change of the polarizing angle $\phi$ should preferably be adjusted to an angle (for example, 15°) smaller than 45°.

In the aforesaid embodiment, both the first FGC 31 and the second FGC 32 are constituted for exciting the TE guided mode. Instead, they may be constituted for exciting the TM guided mode. In this case, as indicated by a curve (2) in FIG. 9, the optical amount I2 introduced into the optical waveguide 22 changes in proportion to $\sin^2 \phi$. Also, in this case, the optical amount I2, i.e. the output of the addition amplifier 38, changes in proportion to the polarizing angle $\phi$, and therefore the recorded signals can be detected in the same manner as mentioned above.

In the aforesaid embodiment, signal detection is carried out on the basis of the signal obtained by the addition of the output of the first photodetector 24 to the output of the second photodetector 25. Instead, the signal detection can also be carried out on the basis of the output signal of the first photodetector 24 or the second photodetector 25. In this case, the first FGC 31 and the second FGC 32 may excite the guided modes different from each other. However, in this case, the output of the first photodetector 24 or the second photodetector 25 fluctuates in accordance with the tracking error. Therefore, the signal detection should preferably be carried out in the manner as in the aforesaid embodiment in order to prevent signal detection error caused by such fluctuations.

The block 12 is moved normal to or approximately normal to the direction as indicated by the arrow U by the optical system feed motor as mentioned above, whereby the incidence position (the position in the radial direction of the magneto-optical disk 13) of the light beam 15 upon the magneto-optical disk 13 is changed and the recorded signals are read out sequentially. The light beam 15 must be made to impinge accurately upon the center of the predetermined signal string (track). The tracking control for accurately maintaining the incidence position of the light beam 15 upon the optical disk 13 will be described below. When the center of the reflected light beam 15' is positioned exactly between the FGC 31 and the FGC 32, the optical amount detected by the first photodetector 24 (i.e. the photodiodes PD1 and PD2) and the optical amount detected by the second photodetector 25 (i.e. the photodiodes PD3 and PD4) coincide with each other. Therefore, in this case, the output S3 of the differential amplifier 40 becomes 0 (zero). On the other hand, when the incidence position of the light beam 15 upon the optical disk 13 becomes incorrect and the optical intensity distribution of the reflected light beam 15' is deviated upwardly in FIG. 2, the optical amount detected by the first photodetector 24 becomes larger than the optical amount detected by the second photodetector 25. Therefore, in this case, the output S3 of the differential amplifier 40 becomes "+" (plus). Conversely, when the optical intensity distribution of the reflected light beam 15' is deviated downwardly in FIG. 2, the output S3 of the differential amplifier 40 becomes "−" (minus). That is, the output S3 of the differential amplifier 40 represents the direction of the tracking error (the direction as indicated by the arrow x in FIG. 2). The output S3 is fed as a tracking error signal to the tracking coil drive control circuit 44. The technique of detecting the tracking error by processing the outputs of the photodiodes PD1 to PD4 in the manner as mentioned above has heretofore been established as the push-pull technique. Upon receiving the tracking error signal S3, the tracking coil drive control circuit 44 feeds an electric current It in accordance with the direction of the tracking error represented by the signal S3 to the tracking coil 19 for moving the objective lens 18 in a direction that cancels the tracking error. In this manner, the light beam 15 is made to impinge accurately upon the center of the signal string.

The focusing control for converging the light beam 15 accurately onto the reflection surface 14 of the magneto-optical disk 13 will be described hereinbelow. When the light beam 15 is focused accurately on the reflection surface 14 of the magneto-optical disk 13, the optical wave 15' converged by the FGC 31 is converged at the middle position between the photodiodes PD1 and PD2. At this time, the optical wave 15' converged by the FGC 32 is converged at the middle position between the photodiodes PD3 and PD4. Therefore, the output of the addition amplifier 35 and the output of the addition amplifier 36 become equal to each other, and the output S2 of the differential amplifier 39 becomes 0 (zero). On the other hand, in the case where the light beam 15 is converged at a position forward from the reflection surface 14, the reflected light beam 15' impinges in the converged form upon the FGC 31 and the FGC 32, and the incidence positions of the optical waves 15', 15' upon the first photodetector 24 and the second photodetector 25 are deviated inwardly, i.e. toward the photodiode PD2 and toward the photodiode PD3. Therefore, in this case, the output of the addition amplifier 35 becomes lower than the output of the addition amplifier 36, and the output S2 of the differential amplifier 39 becomes "−" (minus). Conversely, in the case where the light beam 15 is converged at a position backward from the reflection surface 14, the reflected light beam 15' impinges in the divergent form upon the FGC 31 and the FGC 32, and the incidence positions of the optical waves 15', 15' upon the first photodetector 24 and the second photodetector 25 are deviated outwardly, i.e. toward the photodiode PD1 and toward the photodiode PD4. Therefore, in this case, the output of the addition amplifier 35 becomes higher than the output of the addition amplifier 36, and the output S2 of the differential amplifier 39 becomes "+" (plus). Thus the output S2 of the differential amplifier 39 represents the direction of the focusing error. The output S2 is fed as a focusing error signal to the focusing coil drive control circuit 43. The technique of detecting the focusing error by processing the outputs of the photodiodes PD1 to PD4 in the manner as mentioned above has heretofore been carried out in the Foucault technique using a Foucault prism. Upon receiving the focusing error signal S2, the focusing coil drive control circuit 43 feeds an electric current If in accordance with the direction of the focusing error represented by the signal S2 to the focusing coil 20 for moving the objective lens 18 in a direction that cancels the focusing error. In this manner, the light beam 15 is made to converge accurately onto the reflection surface 14 of the magneto-optical disk 13.

In the course of advance of the light beam 15 emitted by the semiconductor laser 16 from the collimator lens 17 toward the objective lens 18, a part of the light beam 15 is taken by the FGC 31 and the FGC 32 into the optical waveguide 22. Therefore, in order to prevent the light beam 15 from being reflected by an edge face 22c of the optical waveguide 22 and detected by the first photodetector 24 and the second photodetector 25, a light absorbing member 45 should preferably be secured to the edge face 22c, or the edge face 22c should preferably be processed into a rough surface.

In the aforesaid embodiment, the FGC 31 and the FGC 32 are formed so that their gratings closely contact each other. However, the FGC 31 and the FGC 32 may be formed independently of each other in slightly spaced relation. This also applies to the embodiments described below.

Also, the FGC 31 and the FGC 32 may be formed so that the optical waves 15', 15' converged by the FGC 31 and the FGC 32 intersect each other, i.e. so that the position of optical wave convergence by the FGC 31 is on the lower side of the y axis in FIG. 2 and the position of optical wave convergence by the FGC 32 is on the upper side of the y axis.

Further embodiments of the first pickup apparatus for a magneto-optical recording medium in accordance with the present invention will hereinbelow be described with reference to FIGS. 4 to 8, 10, 11 and 12. In FIGS. 4 to 8, 10, 11 and 12, similar elements are numbered with the same reference numerals with respect to FIG. 1.

In an embodiment shown in FIG. 4, the collimator lens 17 in the embodiment shown in FIG. 1 is omitted, and the light beam 15' reflected by the magneto-optical disk 13 is taken in the converged form into the optical waveguide 22. Also with this configuration, the recorded signals, tracking error and focusing error can be detected by detecting the optical waves 15', 15' converged inside of the optical waveguide 22 by the first photodetector 24 and the second photodetector 25 of the types as shown in FIG. 2, and processing the detection signals in the manner as mentioned above.

When the positions on the optical waveguide 22 and the coordinates of the optical wave converging positions by the FGC 31 and the FGC 32 are defined in the same manner as in the embodiment shown in FIG. 1, the m'th grating pattern of each of the FGC 31 and the FGC 32 in the embodiment shown in FIG. 4 is expressed as $$\sqrt{x^2 + (y - L\sin\theta)^2 + (L\cos\theta)^2} -$$

$$N_{TE}\sqrt{(x \mp Fx)^2 + (y - Fy)^2} = m\lambda + \text{const.}$$

(double signs: "+" for the *FGC* 31, "−" for the *FGC* 32)
where λ denotes the optical wavelength of the reflected light beam 15', θ denotes the angle between the center axis of the reflected light beam 15' and the optical waveguide 22, L denotes the distance from the beam diverging point to the FGC 31 and the FGC 32 along the beam center axis as shown in FIG. 4, and $N_{TE}$ denotes the effective refractive index of the optical waveguide 22 with respect to the TE mode optical wave.

In an embodiment shown in FIG. 5, a support 50 is formed of a material exhibiting a substantially large refractive index, and the light beam 15 is reflected by the boundary between the support 50 and a buffer layer 51 toward the magneto-optical disk 13. A reflecting thin film formed of a metal or the like may be provided between the buffer layer 51 and the support 50. Also in this case, the light beam 15' reflected by the magneto-optical disk 13 is introduced by the FGC 31 and the FGC 32 into the optical waveguide 22.

Figure 6:
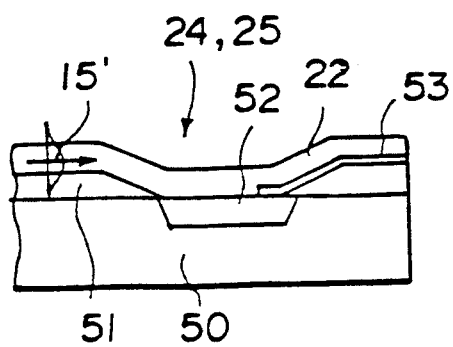
FIG. 6 is a side view showing the photodetector in the embodiment shown in FIG. 5, FIGS. 7 and 8 are side views showing still further embodiments of the first pickup apparatus for a magneto-optical recording medium in accordance with the present invention.

With the configuration as shown in FIG. 5, the support 50 need not be formed of a transparent member. Therefore, in this case, it becomes possible to form the support 50 by use of, for example, an n type Si support, to dispose the buffer layer 51 for preventing the spreading-out optical wave (evanescent optical wave) of the optical waves 15', 15' which are being guided through the optical waveguide 22 from entering the support 50, and to integrate the photodiodes PD1 to PD4 by the provision of a p type Si layer 52 and an electrode 53 as shown in FIG. 6. The photodiodes PD1 to PD4 integrated in this manner are advantageous from the viewpoint of achieving quick response.

Figure 7:
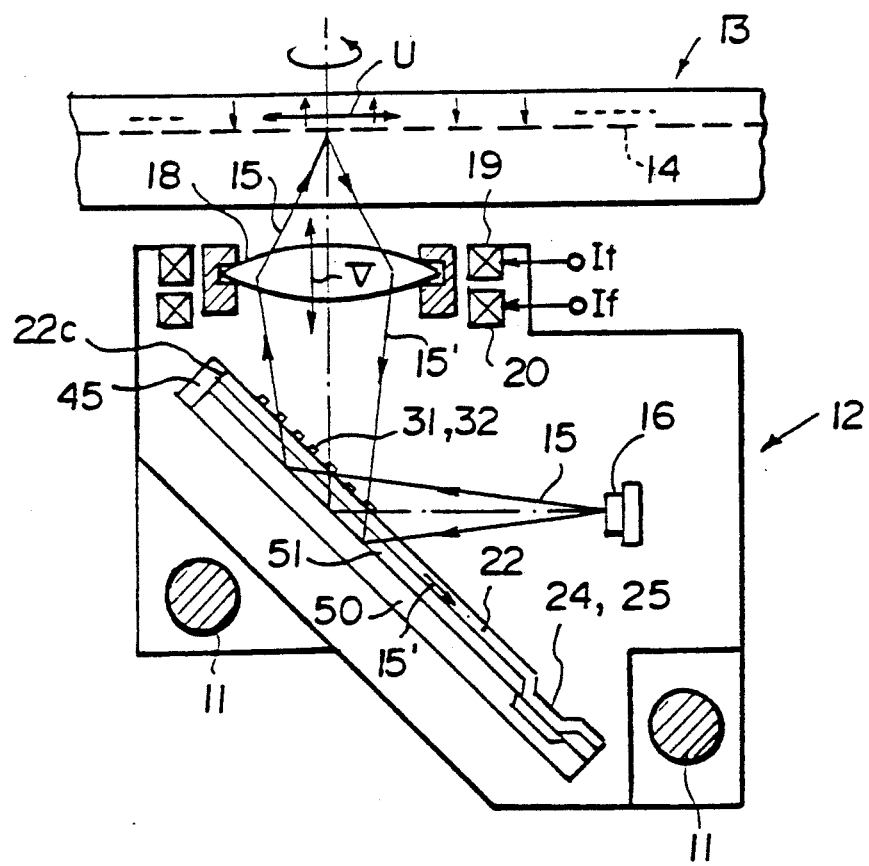

In an embodiment shown in FIG. 7, the light beam 15 emitted by the semiconductor laser 16 in the divergent form is reflected in this form by the boundary between the support 50 and the buffer layer 51 toward the magneto-optical disk 13.

Figure 8:
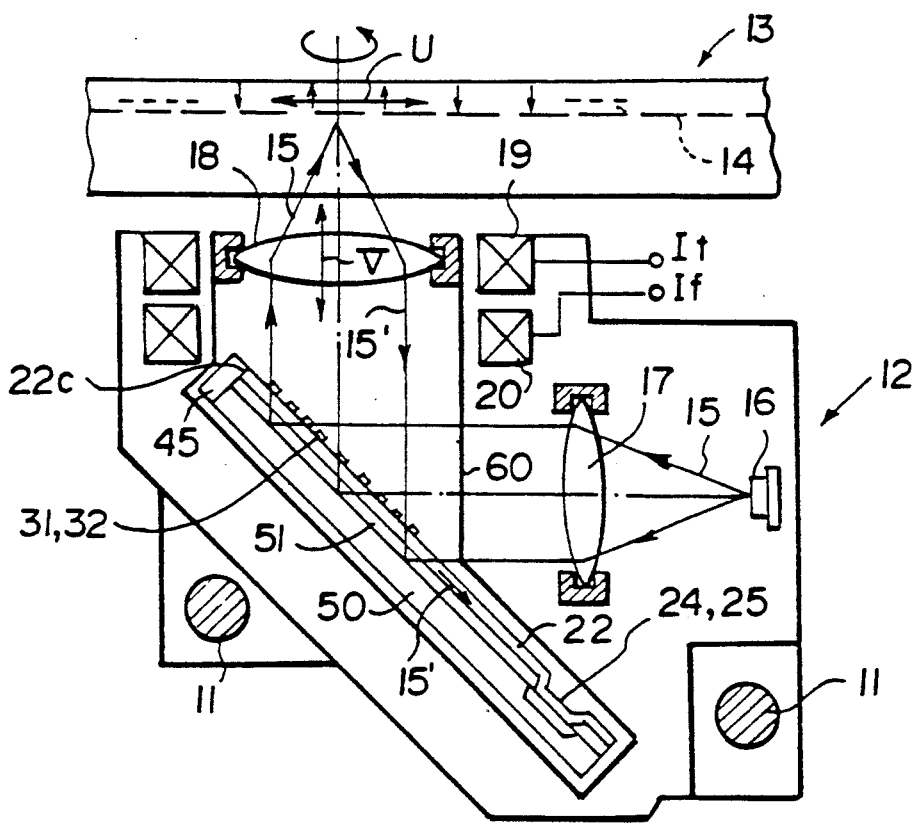

In an embodiment shown in FIG. 8, the optical waveguide 22 and the objective lens 18 are secured to a single head 60, and the head 60 is supported moveably in the tracking direction and in the focusing direction with respect to the block 12. The head 60 is moved by the tracking coil 19 and the focusing coil 20. Specifically, in this embodiment, the optical waveguide 22 is moved together with the objective lens 18 for the purposes of tracking control and focusing control. With this configuration, the problem that the objective lens 18 is deviated from the optical waveguide 22 in the course of tracking control as in the case where the objective lens 18 alone is moved can be eliminated, and tracking control can be carried out more accurately.

In the embodiment shown in FIG. 8, the light beam 15 reflected by the boundary between the support 50 and the buffer layer 51 is made to impinge upon the magneto-optical disk 13. However, also in the case where the optical waveguide 22 and the objective lens 18 are moved integrally with each other as mentioned above, it is possible to constitute the apparatus so that the light beam 15 passing through the optical waveguide 22 impinges upon the magneto-optical disk 13, or to constitute the apparatus so that the light beam 15 passes through the optical waveguide 22 in the divergent form or is reflected in the divergent form by the boundary between the support 50 and the buffer layer 51. Also, besides the optical waveguide 22 and the objective lens 18, the semiconductor laser 16 and the collimator lens 17 may be secured to the head 60 and may be moved integrally with the optical waveguide 22 and the objective lens 18.

In the aforesaid five embodiments, the first photodetector 24 and the second photodetector 25 are secured to or integrated with the surface 22a of the optical waveguide 22, or coupled with the edge face 22b. However, the first photodetector 24 and the second photodetector 25 may be disposed in any other manner on the optical waveguide 22. For example, as shown in FIG. 10, the photodetectors 24 and 25 may be disposed close to the surface 22a of the optical waveguide 22. Also, in the case where the photodetectors 24 and 25 are disposed close to the surface 22a of the optical waveguide 22 in this manner, a diffraction grating 80 for radiating the guided optical waves (reflected light beam) 15', 15' out of the optical waveguide 22 may be disposed on the surface 22a of the optical waveguide 22 as shown in FIG. 11, thereby to improve the light receiving efficiencies of the photodetectors 24 and 25. Also, as shown in FIG. 12, the edge face 22b of the optical waveguide 22 may be polished, and the photodetectors 24 and 25 may be secured in close contact with the edge face 22b.

Besides the aforesaid method of making the FGC 31 and the FGC 32, they can be formed by the planar technique by use of a known photolithographic method, a known holographic transfer method or the like, and can be easily mass-produced through duplication.

Embodiments of the second pickup apparatus for a magneto-optical recording medium in accordance with the present invention will be described hereinbelow.

Figure 13:
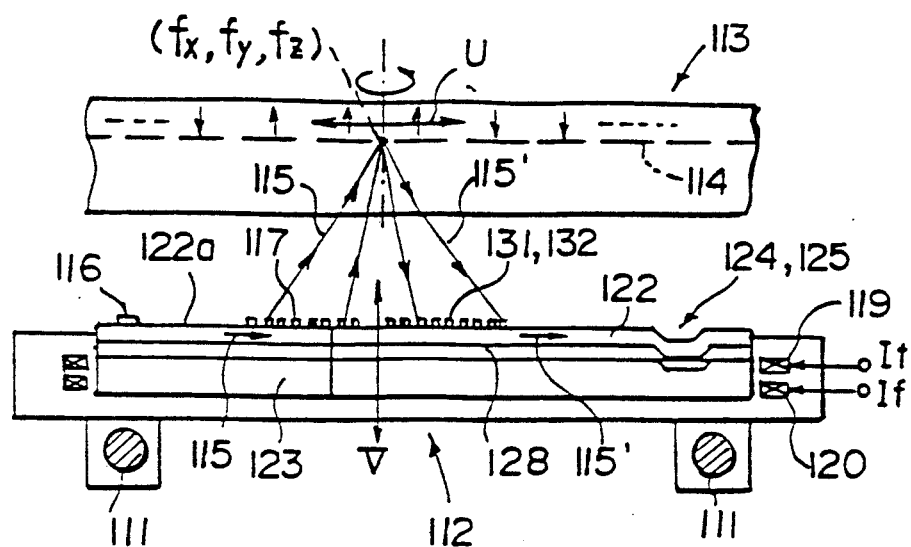
FIG. 13 is a side view showing an embodiment of the second pickup apparatus for a magneto-optical recording medium in accordance with the present invention.

FIG. 13 shows an embodiment of the second pickup apparatus for a magneto-optical recording medium in accordance with the present invention, and FIG. 14 shows the top plan view of the optical waveguides in the embodiment shown in FIG. 13 and an electric circuit used for the embodiment shown in FIG. 13. With reference to FIG. 13, the second pickup apparatus is provided with rods 111, 111 extending at an angle approximately normal to the drawing sheet in FIG. 13, and a block 112 moveable along the rods 111, 111. In order to follow along a signal string (track) along a predetermined groove, the block 112 is moved normal to or approximately normal to the direction of the track (i.e. the direction as indicated by the arrow U at the light beam incidence position) by, for example, a precision feed screw and an optical system feed motor.

A Si support 123 which may be, for example, the n type, is supported on the block 112. An optical waveguide 122 is provided on the support 123 via a buffer layer 128. One edge face 122b of the optical waveguide 122 is polished, and a semiconductor laser 116 for producing a linearly polarized light beam (a laser beam) 115 is secured to the edge face 122b. The light beam 115 produced by the semiconductor laser 116 enters the optical waveguide 122 from the edge face 122b, and advances inside of the optical waveguide 122, by way of example, in the TE guided mode. On the other hand, a first FGC 117 is provided on a surface 122a of the optical waveguide 122. The first FGC 117 is a diffraction grating having a curvature and "chirp". The first FGC 117 radiates the light beam (optical wave) 115, which is guided through the optical waveguide 122, out of the optical waveguide 122, and converges the radiated optical wave 115 on a reflection surface 114 of a magneto-optical disk 113. For the purposes of tracking control and focusing control as will be described later, the support 123 is supported moveably in a tracking direction normal to the direction as indicated by the arrow U and in a focusing direction as indicated by the arrow V, and is moved in these directions by a tracking coil 119 and a focusing coil 120.

The optical waveguide 122 is disposed so that the optical wave 115 is not regularly reflected by the reflection surface 114. Therefore, the optical wave 115 is reflected by the magneto-optical disk 113 as a reflected optical wave 115' to a position spaced from the first FGC 117. A second FGC 131 and a third FGC 132 are disposed adjacent to one another on the surface 122a of the optical waveguide 122 at the position upon which the reflected optical wave 115' impinges. Each of the second FGC 131 and the third FGC 132 is a diffraction grating having a curvature or a curvature and "chirp". The second FGC 131 and the third FGC 132 respectively introduce the reflected optical wave 115' into the optical waveguide 122 and converge the reflected optical waves 115', 115' thus guided through the optical waveguide 122 respectively into a single spot in the optical waveguide 122. As shown in FIG. 14, the second FGC 131 and the third FGC 132 are disposed side by side so that a y axis on the optical waveguide 122 normal to the aforesaid tracking direction and passing through nearly the center of the reflected optical wave 115' intervenes between the FGC 131 and the FGC 132. Also, the FGC 131 and the FGC 132 are formed to converge the optical waves 115', 115' to positions spaced from each other with the y axis intervening therebetween. Grating pitches of the second FGC 131 and the third FGC 132 are adjusted so that the second FGC 131 and the third FGC 132 excite the TE guided mode upon receiving the reflected optical wave 115'.

When positions on the optical waveguide 122 are defined by the y axis and the x axis, i.e. the axis in the tracking direction, the optical wave condensing position on the magneto-optical disk 113 by the first FGC 117 is expressed as (fx, fy, fz), and coordinates of the optical wave converging positions by the FGC 131 and the FGC 132 are respectively expressed as (−Fx, Fy) and (Fx, Fy), an m'th grating pattern of each of the FGC 131 and the FGC 132 having the aforesaid effects is expressed as $$\sqrt{(x - fx)^2 + (y - fy)^2 + fz^2} + N_{TE}\sqrt{(x \mp Fx)^2 + (y - Fy)^2} = m\lambda + \text{const.}$$

(double signs: "+" for the FGC 131, "−" for the FGC 132)

where λ denotes the optical wavelength of the reflected optical wave 115', θ denotes the angle of incidence of the reflected optical wave 115' upon the FGC 131 and the FGC 132, and $N_{TE}$ denotes the effective refractive index of the optical waveguide 122 with respect to the TE mode optical wave.

As shown in FIG. 14, the FGC 131 and the FGC 132 are disposed so that the x axis is inclined at an angle of 45° with respect to the direction of linear polarization of the reflected optical wave 115' as indicated by the arrow P. The direction of linear polarization of the reflected optical wave 115' rotates in accordance with the direction of magnetization in the magneto-optical disk 113. Therefore, in this embodiment, the direction of linear polarization of the optical wave 115' reflected by an un-magnetized part is taken as a reference, and it is adjusted so that the x axis makes an angle of 45° with respect to said reference direction of linear polarization. The FGC 131 and the FGC 132 may also be provided on the surface of the optical waveguide 122 opposite to the surface 122a, i.e. on the lower surface thereof in FIG. 13.

The optical waveguide 122 may be formed by, for example, overlaying the buffer layer 128 formed of $SiO_2$ on the Si support 123, and then sputtering #7059 glass onto the buffer layer 128. On the other hand, the FGC 131 and the FGC 132 may be formed by, for example, forming a Si-N film on the optical waveguide 122 by PCVD (plasma-enhanced chemical vapor deposition), forming a resist pattern by the electron beam direct drawing method, and then transferring the pattern to the Si-N film by RIE. By way of example, in the case where the optical waveguide 122, the FGC 131 and the FGC 132 are formed of the aforesaid materials, the center period of each of the FGC 131 and the FGC 132 which excite the TE guided mode and which have the grating patterns as defined by the aforesaid pattern formula is 0.791 μm.

On the other hand, a first photodetector 124 and a second photodetector 125 are disposed on the surface 122a of the optical waveguide 122 for respectively detecting the optical waves 115', 115' converged in the manner as mentioned above. By way of example, the first photodetector 124 is composed of photodiodes PD101 and PD102 divided from each other by a gap extending in parallel with the y axis, and the second photodetector 125 is composed of photodiodes PD103 and PD104 divided from each other by a gap extending in parallel with the y axis. As shown in detail in FIG. 15, the photodiodes PD101 to PD104 are integrated by forming the buffer layer 128 for preventing the spreading out optical wave (evanescent optical wave) of the optical waves 115', 115', which are being guided, from entering the support 123 on the n type Si support 123, and providing a p type Si layer 129 and an electrode 130. The photodiodes PD101 to PD104 integrated in this manner are advantageous from the viewpoint of achieving quick response.

As shown in FIG. 14, the outputs of the photodiodes PD101 and PD102 are added together by an addition amplifier 134, and the outputs of the photodiodes PD103 and PD104 are added together by an addition amplifier 137. Also, the output of the outer photodiode PD101 of the first photodetector 124 and the output of the outer photodiode PD104 of the second photodetector 125 are added together by an addition amplifier 135, and the outputs of the inner photodiodes PD102 and PD103 are added together by an addition amplifier 136. The outputs of the addition amplifiers 134 and 137 are fed to an addition amplifier 138 and a differential amplifier 140, and the outputs of the addition amplifiers 135 and 136 are fed to a differential amplifier 139. The output of the addition amplifier 138 is fed to a differential amplifier 141. The differential amplifier 141 also receives a reference signal Sref, and generates an output S1 in accordance with the difference between the two received inputs. The output S1 of the differential amplifier 141, an output S2 of the differential amplifier 139, and an output S3 of the differential amplifier 140 are respectively fed to a read-out circuit 142, a focusing coil drive control circuit 143 and a tracking coil drive control circuit 144.

Operations of the second pickup apparatus having the configuration as mentioned above will be described hereinbelow. The light beam (laser beam) 115 produced by the semiconductor laser 116 and guided through the optical waveguide 122 in the divergent form is radiated by the first FGC 117 out of the optical waveguide 122 and is converged to focus on the reflection surface 114 of the magneto-optical disk 113. The magneto-optical disk 113 is rotated by a rotation drive means (not shown) so that the track is moved in the direction as indicated by the arrow U at the incidence position of the optical wave 115. As is well known, the track is a string of image signals, audio signals or the like recorded by use of the directions of magnetization as indicated by the arrows above the reflection surface 114 in FIG. 13. As the direction of magnetization is reversed, the direction of linear polarization of the optical wave 115' reflected by the magneto-optical disk 113 rotates reversely with respect to the direction of linear polarization of the optical wave 115' reflected by the unmagnetized part. Specifically, the direction of linear polarization of the optical wave 115' reflected by the part of the magneto-optical disk 113 magnetized in a direction rotates clockwise from the direction of polarization as indicated by the arrow P in FIG. 14, and the direction of linear polarization of the optical wave 115' reflected by the part of the magneto-optical disk 113 magnetized in the reverse direction rotates counter-clockwise from the direction of polarization as indicated by the arrow P.

The reflected optical wave 115' is introduced into the optical waveguide 122 by the FGC 131 and the FGC 132. The optical waves 115', 115' (the reflected light beam 115') guided through the optical waveguide 122 are converged into two spots with the y axis intervening therebetween by the beam converging effects of the FGC 131 and the FGC 132. The second FGC 131 and the third FGC 132 are formed to excite the TE guided mode as mentioned above, and guide the optical waves having the electric field vectors in the directions as indicated by the arrows E, E in FIG. 14 through the optical waveguide 122. Therefore, when the direction of linear polarization of the reflected optical wave 115' rotates clockwise from the direction of polarization as indicated by the arrow P, the optical amounts of the reflected optical wave 115' introduced by the second FGC 131 and the third FGC 132 into the optical waveguide 122 decrease. When the direction of linear polarization of the reflected optical wave 115' rotates counter-clockwise from the direction of polarization as indicated by the arrow P, the optical amounts of the reflected optical wave 115' introduced by the second FGC 131 and the third FGC 132 into the optical waveguide 122 increase. More specifically, in the case where the angle of the direction of linear polarization of the reflected optical wave 115' with respect to the x axis as shown in FIG. 14 is $\phi$, the optical amount I1 introduced by the FGC 131 or the FGC 132 into the optical waveguide 122 changes in proportion to $\cos^2 \phi$ as indicated by the curve (1) in FIG. 9. Therefore, in the case where the reference signal Sref fed to the differential amplifier 141 is adjusted to the value corresponding to the optical amount Po at the time of the angle $\phi$ of 45° as shown in FIG. 9, the output of the differential amplifier 141 can be made "−" (minus) at the time the direction of linear polarization of the reflected light beam 115' is rotated clockwise from the direction as indicated by the arrow P in FIG. 14, and the output of the differential amplifier 141 can be made "+" (plus) at the time the direction of linear polarization of the reflected light beam 115' is rotated counter-clockwise from the direction as indicated by the arrow P. Accordingly, by discriminating the output S1 of the differential amplifier 141, the directions of magnetization of the magneto-optical disk 113, i.e. the recorded signals, can be detected.

As is clear from FIG. 9, in the case where the change width of the angle $\phi$ is constant, the change amount of the optical amount I1 is the largest and the differential output S1 is the largest when the middle of the change is at $\phi=45°$. Therefore, even though the rotation angle (Kerr rotation angle) of the plane of linear polarization of the reflected light beam 115' caused by the difference in the direction of magnetization of the magneto-optical disk 113 is markedly small (in general, within the range of 0.3° to 0.5°), the rotation of the plane of polarization can be detected accurately. However, the sum of the optical amounts detected by the photodetectors 124 and 125, i.e. the sum of the outputs thereof, becomes the largest at the time the polarizing angle $\phi$ is equal to 0°. Therefore, from the viewpoint of the S/N ratio of the differential output S1, the center of the change of the polarizing angle $\phi$ should preferably be adjusted to an angle (for example, 15°) smaller than 45°.

In the aforesaid embodiment, both the second FGC 131 and the third FGC 132 are constituted for exciting the TE guided mode. Instead, they may be constituted for exciting the TM guided mode. In this case, as indicated by a curve (2) in FIG. 9, the optical amount I2 introduced into the optical waveguide 122 changes in proportion to $\sin^2 \phi$. Also, in this case, the optical amount I2, i.e. the output of the addition amplifier 138, changes in proportion to the polarizing angle $\phi$, and therefore the recorded signals can be detected in the same manner as mentioned above.

In the aforesaid embodiment, signal detection is carried out on the basis of the signal obtained by the addition of the output of the first photodetector 124 to the output of the second photodetector 125. Instead, the signal detection can also be carried out on the basis of the output signal of the first photodetector 124 or the second photodetector 125. In this case, the second FGC 131 and the third FGC 132 may excite the guided modes different from each other. However, in this case, the output of the first photodetector 124 or the second photodetector 125 fluctuates in accordance with the tracking error. Therefore, the signal detection should preferably be carried out in the manner as in the aforesaid embodiment in order to prevent signal detection error caused by such fluctuations.

The block 112 is moved normal to or approximately normal to the direction as indicated by the arrow U by the optical system feed motor as mentioned above, whereby the incidence position (the position in the radial direction of the magneto-optical disk 113) of the optical wave 115 upon the magneto-optical disk 113 is changed and the recorded signals are read out sequentially. The optical wave 115 must be made to impinge accurately upon the center of the predetermined signal string (track). The tracking control for accurately maintaining the incidence position of the optical wave 115 upon the optical disk 113 will be described below. When the center of the reflected optical wave 115' is positioned exactly between the FGC 131 and the FGC 132, the optical amount detected by the first photodetector 124 (i.e. the photodiodes PD101 and PD102) and the optical amount detected by the second photodetector 125 (i.e. the photodiodes PD103 and PD104) coincide with each other. Therefore, in this case, the output S3 of the differential amplifier 140 becomes 0 (zero). On the other hand, when the incidence position of the optical wave 115 upon the optical disk 113 becomes incorrect and the optical intensity distribution of the reflected optical wave 115' is deviated upwardly in FIG. 14, the optical amount detected by the first photodetector 124 becomes larger than the optical amount detected by the second photodetector 125. Therefore, in this case, the output S3 of the differential amplifier 140 becomes "+" (plus). Conversely, when the optical intensity distribution of the reflected optical wave 115' is deviated downwardly in FIG. 14, the output S3 of the differential amplifier 140 becomes "−" (minus). That is, the output S3 of the differential amplifier 140 represents the direction of the tracking error (the direction as indicated by the arrow x in FIG. 14). The output S3 is fed as a tracking error signal to the tracking coil drive control circuit 144. The technique of detecting the tracking error by processing the outputs of the photodiodes PD101 to PD104 in the manner as mentioned above has heretofore been established as the push-pull technique. Upon receiving the tracking error signal S3, the tracking coil drive control circuit 144 feeds an electric current It in accordance with the direction of the tracking error represented by the signal S3 to the tracking coil 119 for moving the support 123 in a direction that cancels the tracking error. In this manner, the optical wave 115 is made to impinge accurately upon the center of the signal string.

The focusing control for converging the optical wave 115 accurately onto the reflection surface 114 of the magneto-optical disk 113 will be described hereinbelow. When the optical wave 115 is focused accurately on the reflection surface 114 of the magneto-optical disk 113, the optical wave 115' converged by the FGC 131 is converged at the middle position between the photodiodes PD101 and PD102. At this time, the optical wave 115' converged by the FGC 132 is converged at the middle position between the photodiodes PD103 and PD104. Therefore, the output of the addition amplifier 135 and the output of the addition amplifier 136 become equal to each other, and the output S2 of the differential amplifier 139 becomes 0 (zero). On the other hand, in the case where the optical wave 115 is converged at a position forward from the reflection surface 114, the reflected optical wave 115' impinges in the converged form upon the FGC 131 and the FGC 132, and the incidence positions of the optical waves 115', 115' upon the first photodetector 124 and the second photodetector 125 are deviated inwardly, i.e. toward the photodiode PD102 and toward the photodiode PD103. Therefore, in this case, the output of the addition amplifier 135 becomes lower than the output of the addition amplifier 136, and the output S2 of the differential amplifier 139 becomes "−" (minus). Conversely, in the case where the optical wave 115 is converged at a position backward from the reflection surface 114, the reflected optical wave 115' impinges in the divergent form upon the FGC 131 and the FGC 132, and the incidence positions of the optical waves 115', 115' upon the first photodetector 124 and the second photodetector 125 are deviated outwardly, i.e. toward the photodiode PD101 and toward the photodiode PD104. Therefore, in this case, the output of the addition amplifier 135 becomes higher than the output of the addition amplifier 136, and the output S2 of the differential amplifier 139 becomes "+" (plus). Thus the output S2 of the differential amplifier 139 represents the direction of the focusing error. The output S2 is fed as a focusing error signal to the focusing coil drive control circuit 143. The technique of detecting the focusing error by processing the outputs of the photodiodes PD101 to PD104 in the manner as mentioned above has heretofore been carried out in the Foucault technique using a Foucault prism. Upon receiving the focusing error signal S2, the focusing coil drive control circuit 143 feeds an electric current If in accordance with the direction of the focusing error represented by the signal S2 to the focusing coil 120 for moving the support 123 in a direction that cancels the focusing error. In this manner, the optical wave 115 is made to converge accurately onto the reflection surface 114 of the magneto-optical disk 113.

In this embodiment, the optical wave 115 is not regularly reflected by the reflection surface 114, and the reflected optical wave 115' does not enter the optical waveguide 122 from the first FGC 117 and does not return to the semiconductor laser 116. Therefore, the problem that mode hopping of the semiconductor laser 116 is caused by the return light and output fluctuations or the like arise can be prevented.

In the aforesaid embodiment, the FGC 131 and the FGC 132 are formed so that their gratings closely contact each other. However, the FGC 131 and the FGC 132 may be formed independently of each other in slightly spaced relation. This also applies to the embodiments described below.

Also, the FGC 131 and the FGC 132 may be formed so that the reflected optical waves 15', 15' converged by the FGC 131 and the FGC 132 intersect each other, i.e. so that the position of optical wave convergence by the FGC 131 is on the lower side of the y axis in FIG. 14 and the position of optical wave convergence by the FGC 132 is on the upper side of the y axis.

Further embodiments of the second pickup apparatus for a magneto-optical recording medium in accordance with the present invention will hereinbelow be described with reference to FIGS. 16 to 24. In FIGS. 16 to 24, similar elements are numbered with the same reference numerals with respect to FIGS. 13, 14 and 15.

Figure 16:
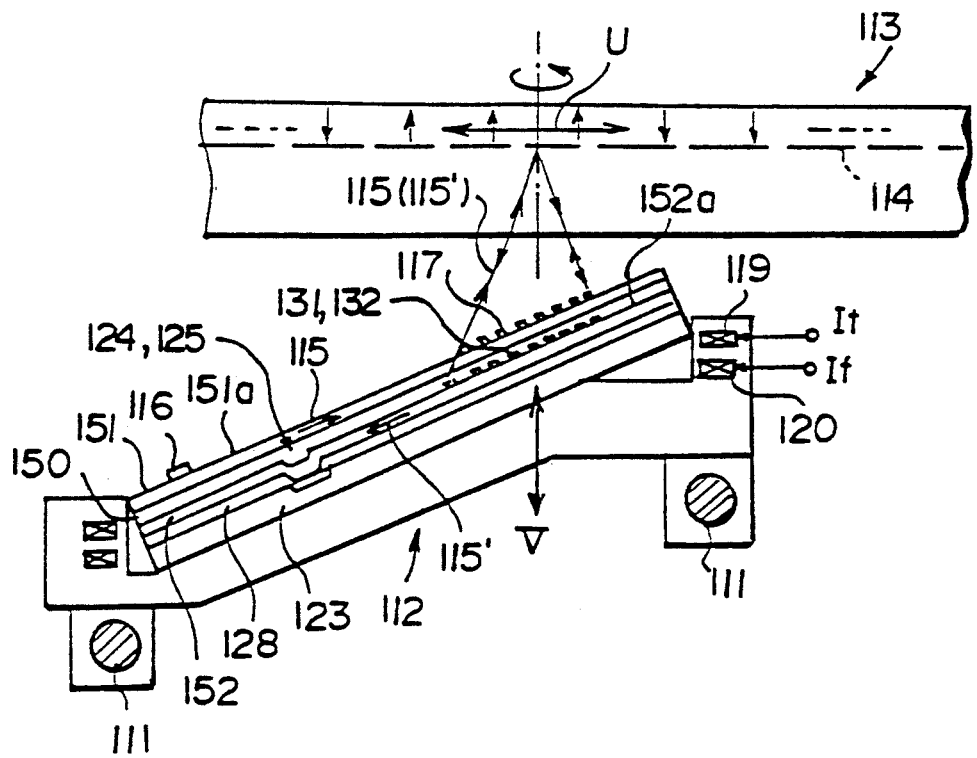
FIG. 16 is a side view showing another embodiment of the second pickup apparatus for a magneto-optical recording medium in accordance with the present invention.
Figure 17:
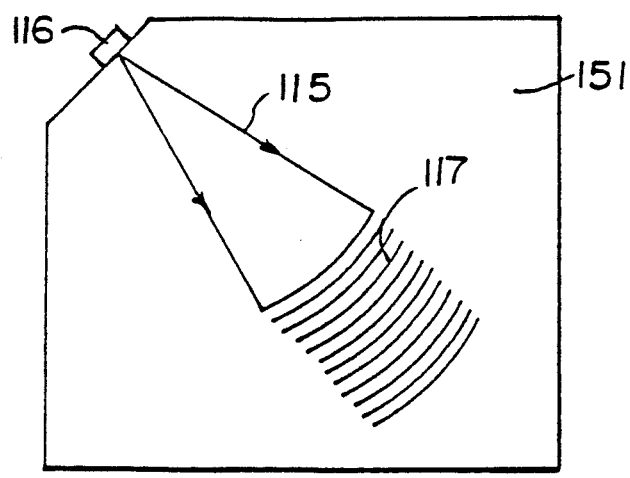
FIGS. 17 and 18 are plan views showing the first optical waveguide and the second optical waveguide in the embodiment shown in FIG. 16, FIGS. 19 and 20 are a side view and a plan view showing a further embodiment of the second pickup apparatus for a magneto-optical recording medium in accordance with the present invention.
Figure 18:
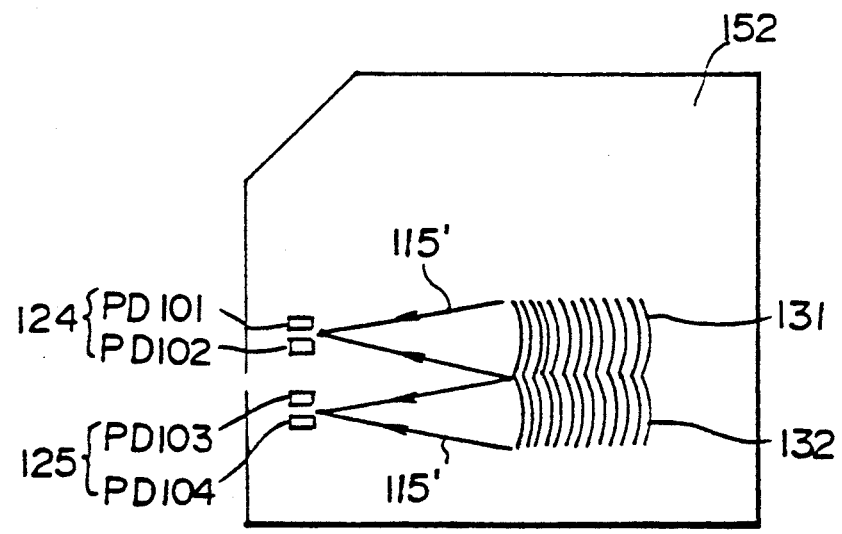

In the aforesaid embodiment shown in FIG. 13, the first optical waveguide and the second optical waveguide are common to each other. Instead, in an embodiment shown in FIG. 16, the first optical waveguide and the second optical waveguide are formed independently of each other. Specifically, as shown in FIG. 16, a second optical waveguide 152 is provided on the support 123 via the buffer layer 128, and a first optical waveguide 151 is provided on the second optical waveguide 152 via a transparent buffer layer 150. Also, the first FGC 117 is formed on a surface 151a of the first optical waveguide 151, and the second FGC 131 and the third FGC 132 are formed on a surface 152a of the second optical waveguide 152. The first FGC 117 on one hand and the second FGC 131 and the third FGC 132 on the other hand are provided in overlapping relation to each other. As shown in FIGS. 17 and 18, the grating array direction of the first FGC 117 and the grating array direction of second FGC 131, the third FGC 132 and the fourth FGC 133 make an angle of 45° with respect to each other. The first optical waveguide 151 and the second optical waveguide 152 are disposed in such directions that the optical wave 115 radiated out of the first FGC 117 is regularly reflected by the reflection surface 114 of the magneto-optical disk 113.

In this case, a part of the optical wave 115 guided through the first optical waveguide 151 is diffracted by the first FGC 117 toward the support 123, is reflected by the boundary between the buffer layer 150 and the second optical waveguide 152 and by the boundary between the buffer layer 128 and the support 123, and advances upward toward the magneto-optical disk 113. In order to efficiently utilize the reflected part of the optical wave 115 and to prevent weakening of the optical wave 115 diffracted from the FGC 117 toward the magneto-optical disk 113, the thicknesses of the buffer layers 128 and 150 should preferably be selected so that the reflected part of the optical wave 115 and the optical wave 115 diffracted by the FGC 117 toward the magneto-optical disk 113 intensify each other by interference therebetween.

In the embodiment shown in FIG. 16, the optical wave 115' reflected by the magneto-optical disk 113 passes through the first FGC 117, the first optical waveguide 151 and the buffer layer 150, impinges upon the second FGC 131 and the third FGC 132, and is introduced by the second FGC 131 and the third FGC 132 into the second optical waveguide 152. Also with this configuration, the recorded signals, tracking error and focusing error can be detected by detecting the optical waves 15', 15' converged inside of the second optical waveguide 152 by the first photodetector 124 and the second photodetector 125, and processing the detection signals in the manner as mentioned above.

A further embodiment of the second pickup apparatus for a magneto-optical recording medium in accordance with the present invention will hereinbelow be described with reference to FIGS. 19 and 20. In this embodiment, as in the embodiment shown in FIG. 16, the first optical waveguide 151 and the second optical waveguide 152 are formed independently of each other, and are formed on the supports 153 and 123 independent of each other. The support 153 is transparent, and is secured to lie upon the second optical waveguide 152.

In this case, the first optical waveguide 151 and the second optical waveguide 152 are disposed so that the optical wave 115 radiated out of the FGC 117 is regularly reflected by the magneto-optical disk 113. Also, the relationship between the first FGC 117 on one hand and the second FGC 131 and the third FGC 132 on the other hand is the same as in the embodiment shown in FIG. 16, and the effects thereof are the same as in the embodiment shown in FIG. 16.

Figure 19:
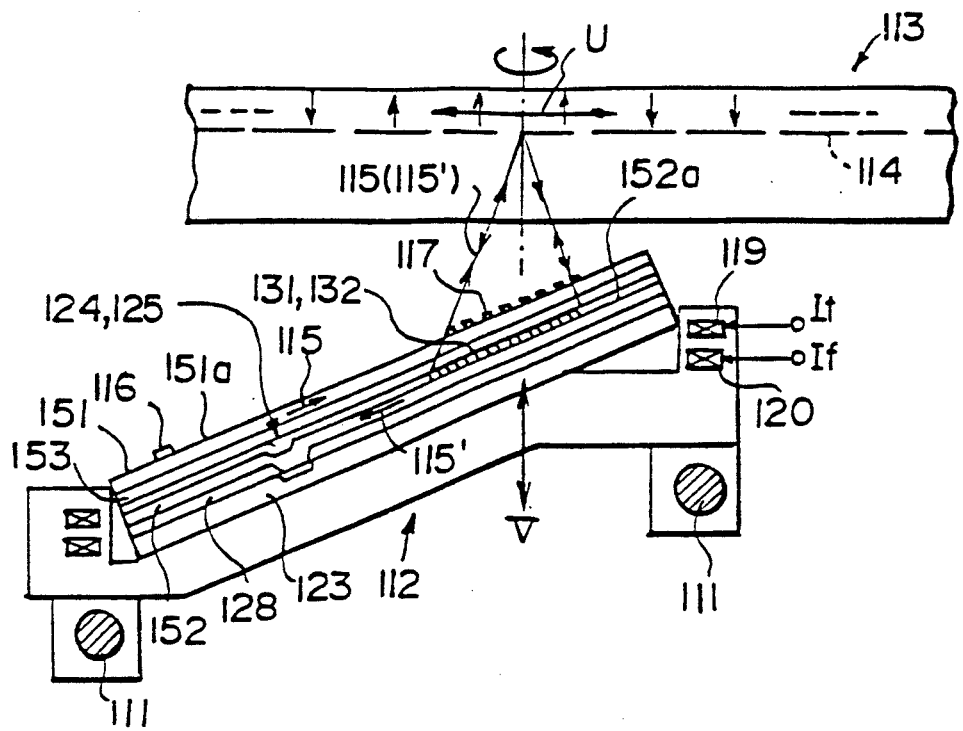
Figure 20:
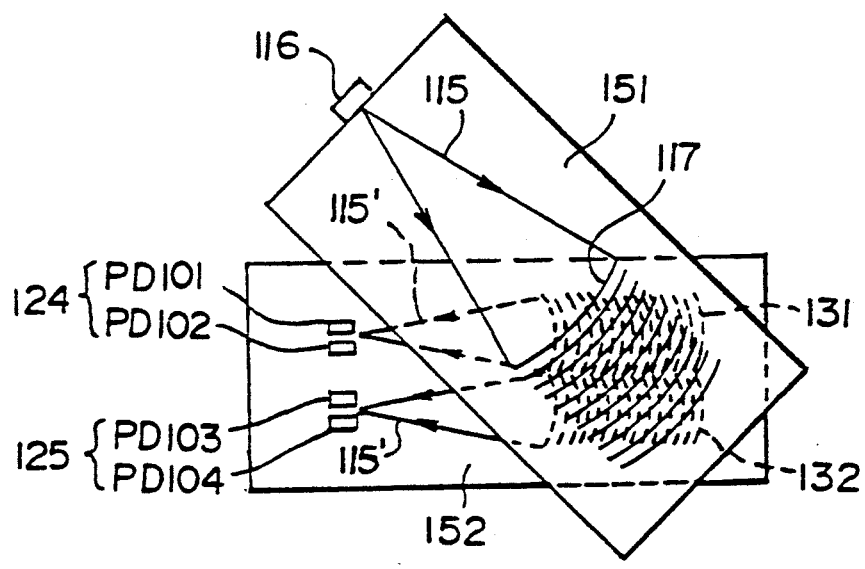

In the embodiments shown in FIGS. 16 and 19, the first optical waveguide 151 is disposed on the side near the magneto-optical disk 113, and the second optical waveguide 152 is disposed on the side remote from the magneto-optical disk 113. The relationship between the positions of the first optical waveguide 151 and the second optical waveguide 152 may be reversed.

In the embodiments shown in FIGS. 13, 16 and 19, the first photodetector 124 and the second photodetector 125 are integrated on the surface 122a of the optical waveguide 122 or the surface 152a of the optical waveguide 152. The photodetectors 124 and 125 may be provided on the optical waveguide 122 or the optical waveguide 152 in a different form. Specifically, when the case where a single optical waveguide is used is taken as an example, as shown in FIG. 21, the photodetectors 124 and 125 may be disposed close to the surface 122a of the optical waveguide 122. In the case where the photodetectors 124 and 125 are disposed close to the surface 122a of the optical waveguide 122 in this manner, a diffraction grating 180 for radiating the guided optical waves (reflected optical wave) 15', 15' out of the optical waveguide 122 may be disposed on the surface 122a of the optical waveguide 122 as shown in FIG. 22, thereby to improve the light receiving efficiencies of the photodetectors 124 and 125. Also, as shown in FIG. 23, an edge face 122c of the optical waveguide 122 may be polished, and the photodetectors 124 and 125 may be secured in close contact with the edge face 122c. As shown in FIG. 24, each of the photodiodes PD101 to PD104 may be formed by, for example, stacking a lower transparent electrode 127a, a thin film-like photoconductive material 127b, and an upper electrode 127c in this order on the optical waveguide 122. In this case, an electric power source 127d is connected to apply a predetermined electric field between the lower transparent electrode 127a and the upper electrode 127c. With the photodiodes PD101 to PD104 having the configuration as mentioned above, when the photoconductive material 127b is exposed to light, a photocurrent of a level proportional to the amount of light flows through the photoconductive material 127b. Therefore, the optical amount which the photoconductive material 127b receives can be detected by detecting the change in potential at a terminal 127e. For constituting the thin film-like photoconductive material 127b, the same materials as mentioned above for the thin film-like photoconductive material 27b may be employed.

Besides the aforesaid method of making the FGC 131 and the FGC 132, they can be formed by the planar technique by use of a known photolithographic method, a known holographic transfer method or the like, and can be easily mass-produced through duplication.

We claim:
1. A pickup apparatus for a magneto-optical recording medium, which comprises:
 i) a light source for irradiating a linearly polarized light beam onto a surface of a magneto-optical recording medium;
 ii) an objective lens for converging said light beam onto a reflection surface of said magneto-optical recording medium,
 iii) an optical waveguide disposed in such a direction that one surface of said optical waveguide receives the light beam reflected by said magneto-optical recording medium,
 iv) a first focusing grating coupler and a second focusing grating coupler provided side by side at an incidence position of said reflected light beam on the surface of said optical waveguide so that a first axis which passes through approximately the center of said reflected light beam, which extends on said surface of said optical waveguide, and which is approximately normal to a tracking direction, intervenes between said first focusing grating coupler and said second focusing grating coupler, so that said first focusing grating coupler and said second focusing grating coupler respectively make said reflected light beam enter said optical waveguide by exciting a TE guided mode or a TM guided mode, and respectively converge optical waves, which are thus guided through said optical waveguide, to positions spaced from each other with said first axis intervening therebetween, wherein a second axis, which is normal to the first axis, and a direction of polarization of the reflected light beam, are inclined with respect to each other at an angle which is greater than 0° and less than 90°, v) a first photodetector and a second photodetector mounted on the surface or an edge face of said optical waveguide for respectively detecting an optical wave converged by said first focusing grating coupler and an optical wave converged by said second focusing grating coupler, vi) an error detection circuit for carrying out detection of tracking error and detection of focusing error on the basis of outputs of said first photodetector and said second photodetector, and vii) a magneto-optical signal detection circuit for detecting signals recorded on said magneto-optical recording medium on the basis of the output of said first photodetector and/or the output of said second photodetector.

2. An apparatus as defined in claim 1 wherein said first focusing grating coupler and said second focusing grating coupler are constituted for exciting a common guided mode, and said magneto-optical signal detection circuit is constituted for detecting said recorded signals on the basis of the sum of the output of said first photodetector and the output of said second photodetector.

3. An apparatus as defined in claim 1 wherein said optical waveguide is disposed so that a plane, on which said axis and a center axis of said reflected light beam lie, and the direction of polarization of said reflected light beam are inclined with respect to each other at an angle within the range of approximately 0° to approximately 45°.

4. An apparatus as defined in claim 1 wherein said first photodetector and said second photodetector are respectively composed of two photodetectors divided from each other by a gap extending approximately in parallel with said axis so that detection of tracking error can be effected by a push-pull technique and detection of focusing error can be effected by a Foucault technique.

5. An apparatus as defined in claim 1 wherein a support of said optical waveguide is formed of a transparent member, and said optical waveguide is disposed between said light source and said objective lens.

6. An apparatus as defined in claim 1 wherein a buffer layer is disposed between said optical waveguide and a support of said optical waveguide, and said optical waveguide is disposed so that said light beam emitted by said light source is reflected by a boundary between said buffer layer and said support toward said magneto-optical recording medium.

7. An apparatus as defined in any of claims 1 to 6 wherein said optical waveguide and said objective lens are disposed independently of each other, and said objective lens alone is moved for the purposes of tracking control and focusing control.

8. An apparatus as defined in any of claims 1 to 6 wherein said optical waveguide is disposed integrally with said objective lens and is moved together with said objective lens for the purposes of tracking control and focusing control.

9. A pickup apparatus for a magneto-optical recording medium, which comprises:

i) a first optical waveguide, ii) a light source mounted on said first optical waveguide for emitting a linearly polarized light beam into said first optical waveguide, iii) a first focusing grating coupler formed on a surface of said first optical waveguide for radiating the optical wave, which is thus guided through said first optical waveguide, out of said first optical waveguide, and converging said radiated optical wave on a reflection surface of a magneto-optical recording medium, iv) a second optical waveguide combined integrally with said first optical waveguide and disposed in such a direction that one surface of said second optical waveguide receives the optical wave reflected by said magneto-optical recording medium, v) a second focusing grating coupler and a third focusing grating coupler provided side by side at an incidence position of said reflected optical wave on the surface of said second optical waveguide so that a first axis which passes through approximately the center of said reflected optical wave, which extends on said surface of said second optical waveguide and which is approximately normal to a tracking direction, intervenes between said second focusing grating coupler and said third focusing grating coupler, so that said second focusing grating coupler and said third focusing grating coupler respectively make said reflected optical wave enter said second optical waveguide by exciting a TE guided mode or a TM guide mode, and respectively converge optical waves, which are thus guided through said second optical waveguide, to positions spaced from each other with said axis intervening therebetween, wherein a second axis, which is normal to the first axis, and a direction of polarization of the reflected light beam, are inclined with respect to each other at an angle which is greater than 0° and less than 90°, iv) a first photodetector and a second photodetector mounted on the surface or an edge face of said second optical waveguide for respectively detecting an optical wave converged by said second focusing grating coupler and an optical wave converged by said third focusing grating coupler, vii) an error detection circuit for carrying out detection of tracking error and detection of focusing error on the basis of outputs of said first photodetector and said second photodetector, and viii) a magneto-optical signal detection circuit for detecting signals recorded on said magneto-optical recording medium on the basis of the output of said first photodetector and/or the output of said second photodetector.

10. An apparatus as defined in claim 9 wherein said first optical waveguide and said second optical waveguide are common to each other, said common optical waveguide is disposed in such a direction that the optical wave radiated out of said first focusing grating coupler is not regularly reflected by said reflection surface, and said first focusing grating coupler on one hand and said second focusing grating coupler and said third focusing grating coupler on the other hand do not overlap each other.

11. An apparatus as defined in claim 9 wherein said first optical waveguide and said second optical waveguide are formed independently of each other and combined integrally in overlapping relation to each other, said first optical waveguide and said second optical waveguide are disposed in such a direction that the optical wave radiated out of said first focusing grating coupler is regularly reflected by said reflection surface, and said first focusing grating coupler on one hand and said second focusing grating coupler and said third focusing grating coupler on the other hand overlap each other.

12. An apparatus as defined in claim 11 wherein said first optical waveguide and said second optical waveguide are provided on different supports, and the support disposed between said first optical waveguide and said second optical waveguide is a transparent support.

13. An apparatus as defined in claim 11 wherein said first optical waveguide and said second optical waveguide are provided on a common support with a transparent buffer layer intervening between said first optical waveguide and said second optical waveguide.

14. An apparatus as defined in claim 9 wherein said light source is directly secured to the edge face of said first optical waveguide, and formed to introducing the light beam from said edge face into said first optical waveguide.

15. An apparatus as defined in claim 9 wherein said second focusing grating coupler and said third focusing grating coupler are constituted for exciting a common guided mode, and said magneto-optical signal detection circuit is constituted for detecting said recorded signals on the basis of the sum of the output of said first photodetector and the output of said second photodetector.

16. An apparatus as defined in any of claims 9 to 1 wherein said first photodetector and said second photodetector are respectively composed of two photodetectors divided from each other by a gap extending approximately in parallel with said axis so that detection of tracking error can be effected by a push-pull technique and detection of focusing error can be effected by a Foucault technique.

17. A pickup apparatus for a magneto-optical recording medium, which comprises:
 i) a first optical waveguide,
 ii) a light source mounted on said first optical waveguide for emitting a linearly polarized light beam into said first optical waveguide,
 iii) a first focusing grating coupler formed on a surface of said first optical waveguide for radiating the optical wave, which is thus guided through said first optical waveguide, out of said first optical waveguide, and converging said radiated optical wave on a reflection surface of a magneto-optical recording medium,
 iv) a second optical waveguide combined integrally with said first optical waveguide and disposed in such a direction that one surface of said second optical waveguide receives the optical wave reflected by said magneto-optical recording medium,
 v) a second focusing grating coupler and a third focusing grating coupler provided side by side at an incidence position of said reflected optical wave on the surface of said second optical waveguide so that a first axis which passes through approximately the center of said reflected optical wave, which extends on said surface of said second optical waveguide and which is approximately normal to a tracking direction, intervenes between said second focusing grating coupler and said third focusing grating coupler, so that said second focusing grating coupler and said third focusing grating coupler respectively make said reflected optical wave enter said second optical waveguide by exciting a TE guided mode or a TM guided mode, and respectively converge optical waves, which are thus guided through said second optical waveguide, to positions spaced from each other with said first axis intervening therebetween,
 vi) a first photodetector and a second photodetector mounted on the surface or an edge face of said second optical waveguide for respectively detecting an optical wave converged by said second focusing grating coupler and an optical wave converged by said third focusing grating coupler,
 vii) an error detection circuit for carrying out detection of tracking error and detection of focusing error on the basis of outputs of said first photodetector and said second photodetector, and
 viii) a magneto-optical signal detection circuit for detecting signals recorded on said magneto-optical recording medium on the basis of the output of said first photodetector and/or the output of said second photodetector, wherein said second optical waveguide is disposed so that a second axis, which is normal to the first axis, and the direction of polarization of said reflected light beam are inclined with respect to each other at an angle within the range of approximately 0° to approximately 45°.

* * * * *